US008487855B2

(12) United States Patent
Ruckmongathan

(10) Patent No.: US 8,487,855 B2
(45) Date of Patent: Jul. 16, 2013

(54) SYSTEM AND METHOD TO DRIVE DISPLAY MATRIX

(75) Inventor: Temkar Narasingarao Ruckmongathan, Bangalore (IN)

(73) Assignee: Raman Research Institute, Karnataka (IN)

( * ) Notice: Subject to any disclaimer, the term of this patent is extended or adjusted under 35 U.S.C. 154(b) by 1213 days.

(21) Appl. No.: 11/824,472

(22) Filed: Jun. 29, 2007

(65) Prior Publication Data

US 2009/0002300 A1 Jan. 1, 2009

(51) Int. Cl.
*G09G 3/36* (2006.01)
*G09G 5/00* (2006.01)
*G06F 3/038* (2013.01)

(52) U.S. Cl.
USPC ................................ 345/94; 345/204; 345/87

(58) Field of Classification Search
USPC ............. 345/33–39, 50, 51, 53, 87–104, 204, 345/208–210, 690–699
See application file for complete search history.

(56) References Cited

U.S. PATENT DOCUMENTS 5,689,280 A * 11/1997 Asari et al. ...................... 345/89

OTHER PUBLICATIONS

Ruckmongathan, T.N., "S3-7 Addressing Techniques for RMS Responding LCDs—A Review," Japan Display '92, pp. 77-80.
Panikumar, K.G., "Displaying Gray Shades in Passive Matrix LCDs Using Successive Approximation," Proceedings of the 7th Asian Symposium on Information Display (ASID'02), Raman Research Institute, Bangalore, India.
Ruckmongathan, T.N., "11.3: Wavelets for Displaying Gray Shades in LCD's," SID 05 Digest, Raman Research Institute, Bangalore, Karnataka, 560080 India, pp. 168-171 (2005).
Ruckmongathan, T.N., "Displaying gray shades in liquid crystal displays," Indian Academy of Sciences, Raman Research Institute, Pramana Journal of Physics, vol. 61, No. 2, pp. 313-329 (Aug. 2003).
Ruckmongathan, T.N., et al., "Reducing Power Consumption in Liquid-Crystal Displays," IEEE: Transactions on Electron Devices, vol. 53, No. 7, pp. 1559-1565 (Jul. 2006).
Conner, A.R., et al., "53-5 Pulse-Height Modulation (PHM) Gray Shading Methods for Passive Matrix LCDs," In Focus Systems, Inc., Japan Display '92, pp. 69-72.
Yeung, Steve, et al., "Gray-scale addressing method by multi-order paraunitary/orthogonal building blocks," Journal of the SID 8/4, Society for Information Display, pp. 283-288, (2000).
Ruckmongathan, T.N., "A Successive Approximation Technique for Displaying Gray Shades in Liquid Crystal Displays (LCDs)," IEEE Transactions on Image Processing, vol. 16, No. 2, pp. 554-561, (Feb. 2007).
Agaian, SOS, et al., "Generalized parametric Slant-Hadamard transform," Elsevier B.V., Signal Processing, vol. 84, pp. 1299-1306 (2004).

* cited by examiner

*Primary Examiner* — Srilakshmi K Kumar
(74) *Attorney, Agent, or Firm* — Kilpatrick Townsend & Stockton LLP

(57) ABSTRACT

A system and method to drive display matrix, comprising: a voltage level generator to provide predetermined voltages, a row voltage selector to select a group of voltages from the voltage level generator depending on select vector to drive row drivers, a column voltage selector to select a group of voltages from the voltage level generator depending on data vector to drive column drivers, and a controller to generate control signals to scan the display as dictated by addressing technique.

16 Claims, 10 Drawing Sheets

SYSTEM AND METHOD TO DRIVE DISPLAY MATRIX

BACKGROUND OF THE INVENTION

1. Field of the Invention

The field of invention is related to reducing hardware complexity of the display drivers using integer wavelets by adding a few analog multiplexers that are common to a large number of stages (one for each output) in the drivers. A simple controller is implemented in a low-cost complex programmable logic device (CPLD). Further, a large number of gray shades are displayed in RMS (root-mean-square) responding displays by using non-integer wavelets. The technique is demonstrated by displaying thirty-two and sixty-four gray shades in twisted nematic liquid crystal displays (LCD).

2. Description of the Prior Art

Capability to display a large number of gray shades is desirable to increase the number of colors and to avoid gray scale contours in images. A larger number of gray shades can be displayed using amplitude modulation (T. N. Ruckmongathan, Addressing Techniques for RMS Responding LCDs—A Review, Proc. Japan Display '92, pp. 77-80, 1992), successive approximation (K. G. Panikumar and T. N. Ruckmongathan, Displaying Gray Shades in Passive Matrix LCDs Using Successive Approximation, Proceedings of the 7$^{th}$ Asian Symposium on Information Display (ASID-2002), pp. 229-232, 2002) and wavelet (T. N. Ruckmongathan, Nanditha Rao P and Ankita Prasad, Wavelets for Displaying Gray Shades in LCDs, SID 05 Digest, 2005 Society for Information Display International Symposium Digest of Technical papers, pp. 168-171, 2005) techniques. Several addressing techniques for displaying gray shades in RMS (root-mean-square) responding matrix LCDs are reviewed in T. N. Ruckmongathan, "Displaying gray shades in liquid crystal displays", Pramana Vol. 61, No. 2, pp. 313-329, 2003. A technique to display eight gray shades using wavelets (T. N. Ruckmongathan, Nanditha Rao P and Ankita Prasad, Wavelets for Displaying Gray Shades in LCDs, SID 05 Digest, 2005 Society for Information Display International Symposium Digest of Technical papers, pp. 168-171, 2005) was presented in the Society for Information Display conference as a proof of the concept. A technique to achieve good reduction in hardware complexity of the drive electronics (drivers as well as the controller) when a large number of gray shades are displayed using integer wavelets and other wavelets is described here.

SUMMARY OF THE INVENTION

An objective of the invention is to develop a system to drive display matrix.

Another objective of the invention is to ensure high quality images (cross-talk free) having good brightness uniformity among pixels that are driven to the same state.

Yet another objective of the invention is to achieve switching times of the same order when pixels are switched from one arbitrary gray shade to another arbitrary gray shade.

Another objective of the invention is to develop a voltage level generator to provide predetermined voltages.

Still another objective of the invention is to develop a row voltage selector to select a group of voltages from the voltage level generator depending on select vector as input voltages to feed to the bus bars of voltages in the row drivers.

Still another objective of the invention is to develop a column voltage selector to select a group of voltages from the voltage level generator depending on select vector as input voltages to feed to the bus bars of voltages in the column drivers.

Still another objective of the invention is to develop a controller to generate control signals to scan the display as dictated by addressing technique.

Yet another objective of the present invention is to develop a method to reduce driver circuit hardware for displaying gray shades.

Another objective of the invention is choosing wavelets based on gray shade data bits to form wavelet matrix wherein each column in the matrix is select vector and the number of rows of the wavelet matrix is not necessarily equal to the number of gray shade data bits.

Still another objective of the invention is to choose the number of rows in a group of scanning electrodes (and also the wavelet matrix) to be a number that is equal to powers of two (2, 4, 8, etc.) to facilitate address generation using the natural binary counter.

Still another objective of the invention is grouping of scanning electrodes based on number of rows in the matrix and thereafter constructing data matrix by selecting the gray shade data bits corresponding to elements of the wavelet matrix wherein each column of the data matrix is a data vector.

Still another objective of the invention is generating voltages for data electrodes and thereby applying the select vector and the corresponding voltages for the data electrodes in the group.

Still another objective of the invention is rotating rows of the wavelet matrix and the data matrix once, followed by scanning the matrix display with the rotated matrix until every row of the wavelet matrix and the data matrix takes position of first row in the respective matrix for displaying gray shades.

The present invention is related to a system to drive display matrix, comprising: a voltage level generator to provide predetermined voltages that are based on wavelets, a row voltage selector to select a group of voltages from the voltage level generator depending on select vector as input voltages to the row drivers, a column voltage selector to select a group of voltages from the voltage level generator depending on the select vector as input voltages to the column drivers, and a controller to generate control signals to scan the display as dictated by the addressing technique; and a method to reduce hardware of drivers to display gray shades, the method comprising steps of: choosing wavelets based on gray shade data bits to form a wavelet matrix wherein each column in the matrix is select vector and the number of rows of the wavelet matrix is not necessarily equal to the number of gray shade data bits, grouping of scanning electrodes based on number of rows in the matrix and thereafter constructing data matrix by selecting the gray shade data bits corresponding to elements of the wavelet matrix wherein each column of the data matrix is a data vector, generating voltages for data electrodes and thereby applying the select vector and the corresponding voltages for the data electrodes in the group, and rotating rows of the wavelet matrix and the data matrix once, followed by repeating steps of scanning the display until every row of the wavelet matrix and the data matrix takes position of first row in the respective matrix for displaying gray shades.

DETAILED DESCRIPTION OF THE INVENTION

Figure 1:
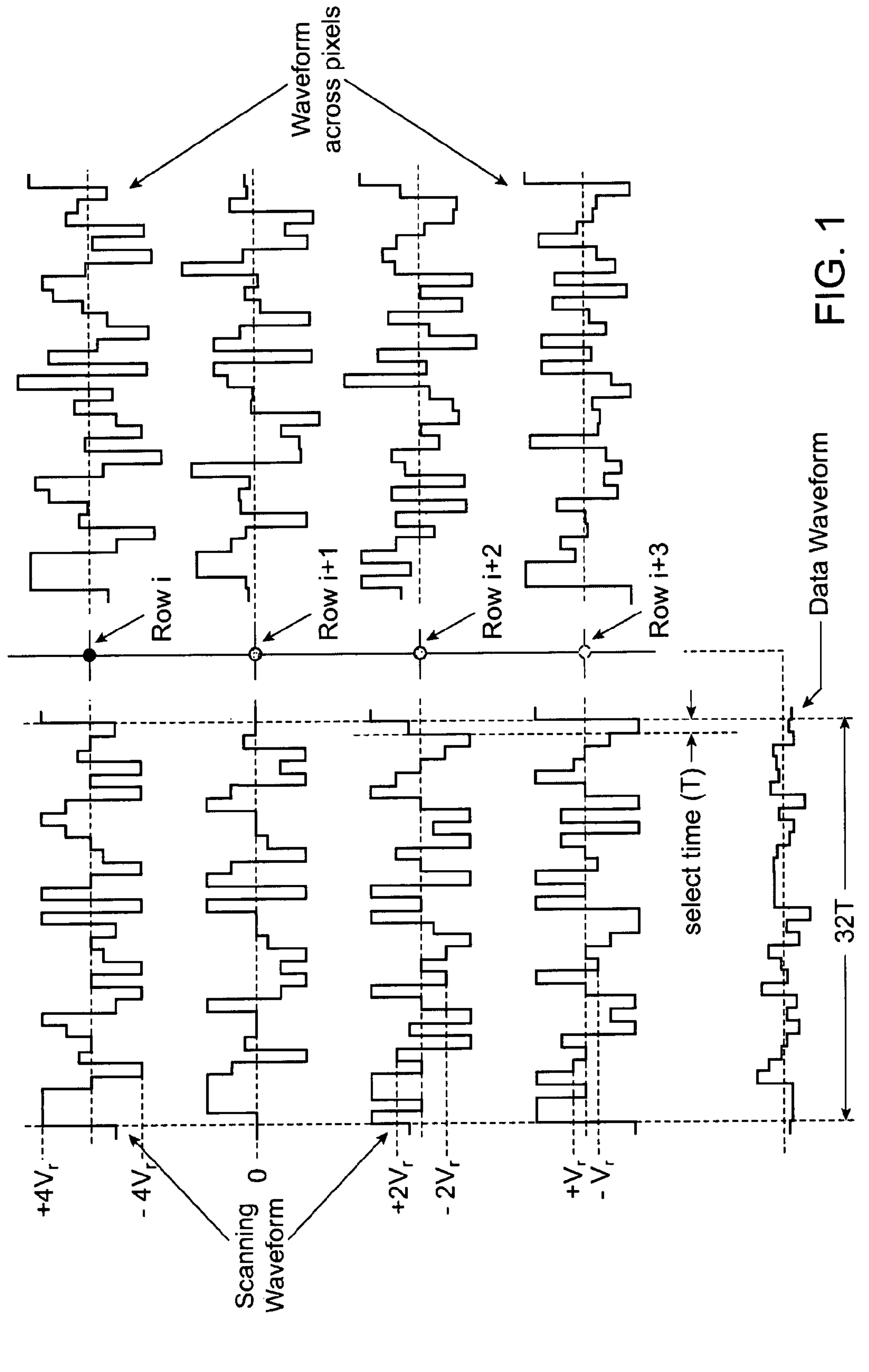
FIG. 1 shows typical waveforms when scanning of the matrix display is based on integer wavelets. The scanning (row) waveforms have seven voltage levels and the data waveforms have eighteen voltages.

The embodiment of the invention is a system to drive display matrix, comprising: a voltage level generator to provide predetermined voltages based on wavelets, a row voltage selector to select a group of voltages from the voltage level generator depending on select vector as input voltages to the row drivers, a column voltage selector to select a group of voltages from the voltage level generator depending on the select vector as input voltages to the column drivers, and a controller to generate control signals to scan the display as dictated by the addressing technique.

In yet another embodiment of the present invention, the row drivers select a final voltage from the group of input voltages to drive rows of the display.

In still another embodiment of the present invention, the column drivers select a final voltage from the group of input voltages to drive columns of the display.

In still another embodiment of the present invention, the row and column driver is comprised of one stage of shift registers and latches to select the final voltage.

In still another embodiment of the present invention, the voltage selectors are preferably analog multiplexers.

In still another embodiment of the present invention, the row voltage selectors and the column voltage selectors are common to the entire row drivers and column drivers respectively.

In still another embodiment of the present invention, the controller sends control signals to the voltage selectors and the drivers to scan the display.

In still another embodiment of the present invention, the controller comprises a binary counter to generate address of pixels.

Another embodiment of the present invention is a method to reduce hardware of row and column drivers for displaying gray shades, the method comprising steps of: choosing wavelets based on gray shade data bits to form a wavelet matrix wherein each column in the matrix is select vector and the number of rows of the wavelet matrix is not necessarily equal to the number of gray shade data bits, grouping of scanning electrodes based on number of rows in the matrix and thereafter constructing data matrix by selecting the gray shade data bits corresponding to elements of the wavelet matrix wherein each column of the data matrix is a data vector, generating voltages for data electrodes and thereby applying the select vector and the corresponding voltages for the data electrodes in the group, and rotating rows of the wavelet matrix and the data matrix once, followed by repeating steps of scanning the display until every row of the wavelet matrix and the data matrix takes position of first row in the respective matrix for displaying gray shades.

In yet another embodiment of the present invention, amplitude of the wavelets is an integer.

In still another embodiment of the present invention, energy of the wavelets is equal to an integer power of two.

In still another embodiment of the present invention, the energy of the wavelet is chosen to correspond uniquely to weight of the gray shade data bit.

In still another embodiment of the present invention, the wavelets are DC free to ensure long life of display.

In still another embodiment of the present invention, the wavelets are selected from the group comprising Haar wavelets, slant wavelets and other orthogonal wavelets.

In still another embodiment of the present invention, the voltage for data electrodes is generated using dot product of the select vector and the data vector.

In still another embodiment of the present invention, the voltage for the data electrodes is generated for the entire data electrodes and the entire groups.

The technique is illustrated with the Haar wavelets and slant wavelets as examples. A similar procedure can be followed for scanning the matrix with other wavelets. The first step is to construct a wavelet matrix because multiplexing the data to the pixels in the display is possible when the matrix display is scanned with waveforms derived from orthogonal functions or matrices. Selection of wavelets and the construction of a wavelet matrix with them are described in the next section.

A. Construction of a Wavelet Matrix Based on Wavelets

A set of Haar wavelets is chosen and the amplitude of the wavelets is modified such that the following conditions are satisfied:

1. Amplitude of the wavelets is an integer.
2. Energy of a wavelet is equal to an integer power of two.
3. Energy of each wavelet chosen to correspond uniquely to weight of a bit in the gray shade data.
4. Wavelets are DC free so that the waveforms across the pixels will also be DC free to ensure long life of the display.

A set of six wavelets satisfying these conditions are shown in (1) to (6).

$$w_{B5}=\{+4,+4,+4,+4,-4,-4,-4,-4\} \quad (1)$$

$$w_{B4}=\{+4,+4,-4,-4\} \quad (2)$$

$$w_{B3}=\{+4,-4\} \quad (3)$$

$$w_{B2}=\{+2,+2,-2,-2\} \quad (4)$$

$$w_{B1}=\{+2,-2\} \quad (5)$$

$$w_{B0}=\{+1,+1,-1,-1\} \quad (6)$$

Energies of these wavelets are 128, 64, 32, 16, 8 and 4 respectively and they are proportional (×4) to the weight of the most significant to the least significant bit of the gray shade data. Subscripts B5 to B0 in (1) to (6) correspond to the binary digit (bit) of the gray shade data. The gray shade value $g_{i,j}$ ranges from −63 to +63 in steps of 2 as shown in the following expression.

$$g_{i,j} = \sum_{k=0}^{5} 2^k \cdot d_k;\ d_k = \begin{cases} +1 & \forall \text{ logic } 0 \\ -1 & \forall \text{ logic } 1 \end{cases} \quad (7)$$

The wavelets in (1) to (6) are combined to form a wavelet matrix as shown in (8).

$$O(1)_{4\times8} = \begin{bmatrix} +4 & -4 & +4 & -4 & +4 & -4 & +4 & -4 \\ +2 & 0 & -2 & 0 & +2 & 0 & -2 & 0 \\ 0 & +4 & 0 & -4 & 0 & +4 & 0 & -4 \\ +2 & +1 & +4 & -1 & -2 & -1 & -4 & +1 \end{bmatrix} \quad (8)$$

Although it is possible to obtain a wavelet matrix with just three rows, the number of rows is chosen to be four to reduce the hardware complexity of the controller. Columns of the wavelet matrix in (8) are referred to as the select vectors. Each element of the wavelet matrix corresponds to a bit of the gray shade data ($d_i$) as shown in the matrix $D(1)_{4\times8}$ in (9).

$$D(1)_{4\times8} = \begin{bmatrix} d_5 & d_5 & d_5 & d_5 & d_5 & d_5 & d_5 & d_5 \\ d_2 & 0 & d_2 & 0 & d_2 & 0 & d_2 & 0 \\ 0 & d_4 & 0 & d_4 & 0 & d_4 & 0 & d_4 \\ d_1 & d_0 & d_3 & d_0 & d_1 & d_0 & d_3 & d_0 \end{bmatrix} \quad (9)$$

Several wavelet matrices can be constructed with the wavelets in (1) to (6). Hence the matrix in (8) is not a unique, for example the matrix in (10) and the associated data matrix in (11) could also be used for scanning the matrix LCDs.

$$O(2)_{4\times8} = \begin{bmatrix} +4 & -4 & +4 & -4 & +4 & -4 & +4 & -4 \\ 0 & +2 & 0 & -2 & 0 & +2 & 0 & -2 \\ +4 & 0 & -4 & 0 & +4 & 0 & -4 & 0 \\ +4 & +1 & -2 & -1 & -4 & -1 & +2 & +1 \end{bmatrix} \quad (10)$$

$$D(2)_{4\times8} = \begin{bmatrix} d_5 & d_5 & d_5 & d_5 & d_5 & d_5 & d_5 & d_5 \\ 0 & d_2 & 0 & d_2 & 0 & d_2 & 0 & d_2 \\ d_4 & 0 & d_4 & 0 & d_4 & 0 & d_4 & 0 \\ d_3 & d_0 & d_1 & d_0 & d_3 & d_0 & d_1 & d_0 \end{bmatrix} \quad (11)$$

B. Scanning the Matrix Display

Consider a matrix display with N and M orthogonal electrodes with picture-elements (pixels) located at the intersection of these address lines. Let the gray shade of the pixel located at the intersection of row 'i' and column 'j' be $g_{i,j}$ as given in (7). The matrix display may be scanned either by selecting the row electrodes or the column electrodes. The electrodes that are used for scanning the display are called the scanning electrodes and the electrodes that are orthogonal to the scanning electrodes are referred to as the data electrodes. Let the number of scanning electrodes be N. These electrodes are grouped to form about (N/4) sets of scanning electrodes each consisting of four electrodes. The display is scanned by selecting one set (four) of scanning electrodes at a time by applying voltages that are proportional to elements of the select vector. For example, the address lines can be selected by applying $-4V_r$, 0, $+4V_r$ and $+V_r$ when the second column of the matrix in (8) is the select vector (shown in (12)).

$$\begin{bmatrix} -4 \\ 0 \\ +4 \\ +1 \end{bmatrix} \quad (12)$$

All the other (N−4) non-selected scanning electrodes are grounded. Voltages for the data electrodes are obtained by computing the dot product of the select vector with the data vectors. The data vector is obtained by picking the bits of the gray shade data as dictated by the elements of the column in (9) that corresponds to the select vector. In our example, the bit-5 (MSB) of the pixels located on the first selected electrode, bit-4 of the pixels on the third selected electrode and bit-0 (LSB) of the pixels in the fourth selected electrode are used to form the data vector because the elements of the select vectors correspond to the wavelets in (1), (2) and (6) respectively. Second element of the data vector is zero because the corresponding element of the select vector is also zero. Data voltages for all the data electrodes in the display are computed by using the dot product as shown in (13).

$$V_{data-j} = \begin{bmatrix} -4 \\ 0 \\ +4 \\ +1 \end{bmatrix} \cdot \begin{bmatrix} d_5 \\ 0 \\ d_4 \\ d_0 \end{bmatrix} \cdot V_c \tag{13}$$

Select and data voltages are applied to the respective electrodes simultaneously during a time interval T, referred to as the select time. A frame is complete when all the (N/4) sets of scanning electrodes are selected with all the select vectors of (8). At the end of the frame, energy delivered to the pixels in the first electrode of all the sets is proportional to the most significant bit of the gray shade data because the energy of the wavelet in the first row of the wavelet matrix in (8) corresponds to the most significant bit. Similarly, the energies delivered to the second and third rows of the sets are proportional to the bit-2 and bit-4 respectively. Energy delivered to the pixels in the fourth row is proportional to the sum of the energies of the bit-3, bit-1 and bit-0. Three more frames are necessary to ensure that the energy delivered to all the pixels in the display is proportional to the sum of the energies corresponding to all the bits of the gray shade data. Hence, (8N) time intervals are necessary to complete a cycle. The wavelet matrix in (8) and the corresponding matrix in (9) are rotated three times (row-wise) and the scanning is performed so that the three additional frames will complete a cycle. For example, rotating the matrix down once will ensure that the first row of each set of the scanning lines will get energy that is proportional to the sum of the energies of bit-3, bit-1 and bit-0. Energies delivered to the second, third and fourth lines in each set of scanning lines will be proportional to that of the bit-5, bit-2 and bit-4 respectively. Wavelet matrices for the second, third and the fourth frames and their corresponding data matrices are given in (14)-(19).

$$O(2)_{4\times8} = \begin{bmatrix} +2 & +1 & +4 & -1 & -2 & -1 & -4 & +1 \\ +4 & -4 & +4 & -4 & +4 & -4 & +4 & -4 \\ +2 & 0 & -2 & 0 & +2 & 0 & -2 & 0 \\ 0 & +4 & 0 & -4 & 0 & +4 & 0 & -4 \end{bmatrix} \tag{14}$$

$$D(2)_{4\times8} = \begin{bmatrix} d_1 & d_0 & d_3 & d_0 & d_1 & d_0 & d_3 & d_0 \\ d_5 & d_5 & d_5 & d_5 & d_5 & d_5 & d_5 & d_5 \\ d_2 & 0 & d_2 & 0 & d_2 & 0 & d_2 & 0 \\ 0 & d_4 & 0 & d_4 & 0 & d_4 & 0 & d_4 \end{bmatrix} \tag{15}$$

$$O(3)_{4\times8} = \begin{bmatrix} 0 & +4 & 0 & -4 & 0 & +4 & 0 & -4 \\ +2 & +1 & +4 & -1 & -2 & -1 & -4 & +1 \\ +4 & -1 & +4 & -4 & +4 & -4 & +4 & -4 \\ +2 & 0 & -2 & 0 & +2 & 0 & -2 & 0 \end{bmatrix} \tag{16}$$

$$D(3)_{4\times8} = \begin{bmatrix} 0 & d_4 & 0 & d_4 & 0 & d_4 & 0 & d_4 \\ d_1 & d_0 & d_3 & d_0 & d_1 & d_0 & d_3 & d_0 \\ d_5 & d_5 & d_5 & d_5 & d_5 & d_5 & d_5 & d_5 \\ d_2 & 0 & d_2 & 0 & d_2 & 0 & d_2 & 0 \end{bmatrix} \tag{17}$$

$$O(4)_{4\times8} = \begin{bmatrix} +2 & 0 & -2 & 0 & +2 & 0 & -2 & 0 \\ 0 & +4 & 0 & -4 & 0 & +4 & 0 & -4 \\ +2 & +1 & +4 & -1 & -2 & -1 & -4 & +1 \\ +4 & -4 & +4 & -4 & +4 & -4 & +4 & -4 \end{bmatrix} \tag{18}$$

-continued $$D(4)_{4\times8} = \begin{bmatrix} d_2 & 0 & d_2 & 0 & d_2 & 0 & d_2 & 0 \\ 0 & d_4 & 0 & d_4 & 0 & d_4 & 0 & d_4 \\ d_1 & d_0 & d_3 & d_0 & d_1 & d_0 & d_3 & d_0 \\ d_5 & d_5 & d_5 & d_5 & d_5 & d_5 & d_5 & d_5 \end{bmatrix} \tag{19}$$

In summary, a cycle is complete when all the sets of scanning electrodes are selected with all the select vectors in the wavelet matrices of (8), (14), (16) and (18) once. Typical waveforms based on the wavelet matrix in (10) are shown in FIG. 1. Each select vector in (10) is rotated to obtain three other select vectors. The waveforms across the pixels are DC free because the wavelets in these wavelet matrices are DC free.

Analysis

The RMS voltage across pixels in the display when the display is scanned with waveforms derived from wavelets is as follows.

$$V_{pixel}(RMS) = \sqrt{\frac{4\sum_{k=0}^{5} 2^k (V_r^2 - 2 \cdot d_{k,i,j} V_r \cdot V_c + N \cdot V_c^2)}{8N}} \tag{20}$$

$$V_{ON}(RMS) = \sqrt{\frac{63(V_r^2 + 2V_r \cdot V_c + N \cdot V_c^2)}{2N}} \tag{21}$$

$$V_{OFF}(RMS) = \sqrt{\frac{63(V_r^2 - 2V_r \cdot V_c + N \cdot V_c^2)}{2N}} \tag{22}$$

The selection ratio, defined as the ratio of RMS voltage across the ON pixels to that across OFF pixels, is a maximum when $$\frac{V_r}{V_c} = \sqrt{N} \tag{23}$$

$$\text{and the maximum selection ratio is } \frac{V_{ON}}{V_{OFF}} = \sqrt{\frac{\sqrt{N}+1}{\sqrt{N}-1}}. \tag{24}$$

It is the maximum selection ratio that is attainable by any addressing technique for driving passive matrix LCDs. Selection ratio is a measure of the discrimination that can be achieved between ON and OFF pixels and a higher selection ratio will ensure good contrast in the display. The OFF pixels in the display are biased near the threshold voltage of the LCD and the supply voltage of the drive electronics is obtained by equating the expression for the voltage across OFF pixels to the threshold voltage of the LCD.

$$V_{OFF} = \sqrt{\frac{63(2N - 2\sqrt{N})}{2N}} \cdot V_c = V_{threshold} \tag{25}$$

$$\text{Hence, } V_c = \frac{V_{threshold}}{\sqrt{63\left(1 - \frac{1}{\sqrt{N}}\right)}} \tag{26}$$

Supply voltage is determined by the maximum swing in the addressing waveforms. Maximum amplitude of the scanning waveforms is small as compared to that of the data voltages when N is small. It is higher than the maximum amplitude of the data voltages when N is large. Hence, the supply voltage is defined for two ranges of N. Maximum swing in the data waveform is also dependent on the wavelet matrix. For example, the maximum amplitude is 10 $V_c$ when the wavelet matrix in (8) is used whereas it is 12 $V_c$ when the matrix in (10) is used. Supply voltage when the wavelet matrix in (8) is used is:

$$V_{s(8)} = \begin{cases} 20V_c & \forall \ N \le 6 \\ 8\sqrt{N}\,V_c & \forall \ N > 6 \end{cases} \quad (27)$$

The supply voltage when matrix of (10) is used for scanning the display is given in (28).

$$V_{s(10)} = \begin{cases} 24V_c & \forall \ N \le 9 \\ 8\sqrt{N}\,V_c & \forall \ N \ge 9 \end{cases} \quad (28)$$

$$\text{Supply voltage}_{(N\ge 9)} = 8\cdot V_r = 8\sqrt{N}\,V_c = \frac{8\sqrt{N}\,V_{threshold}}{\sqrt{63\left(1-\frac{1}{\sqrt{N}}\right)}} \quad (29)$$

The analysis presented in the previous section is independent of the scanning sequence, the order in which the scanning electrodes are selected with select vectors. There are 32 ! ways of selecting a set of four electrodes with the thirty-two select vectors and the (N/4) sets of scanning electrodes themselves may be selected in (N/4)! ways. The RMS voltage across the pixel will not change with the scanning sequence but the frequency spectrum across the pixels and the power consumption of the display will depend on the scanning sequence (T. N. Ruckmongathan, Reducing Power Consumption in Liquid-Crystal Displays, IEEE trans. On Electron Devices, Vol. 53, No. 7, pp. 1559-1566, July 2006).

Drive Electronics

The techniques to reduce the hardware complexity of the drive electronics are outlined in this section.

C. Reducing the Hardware Complexity

1) Row (Scan) Drivers

Figure 2:
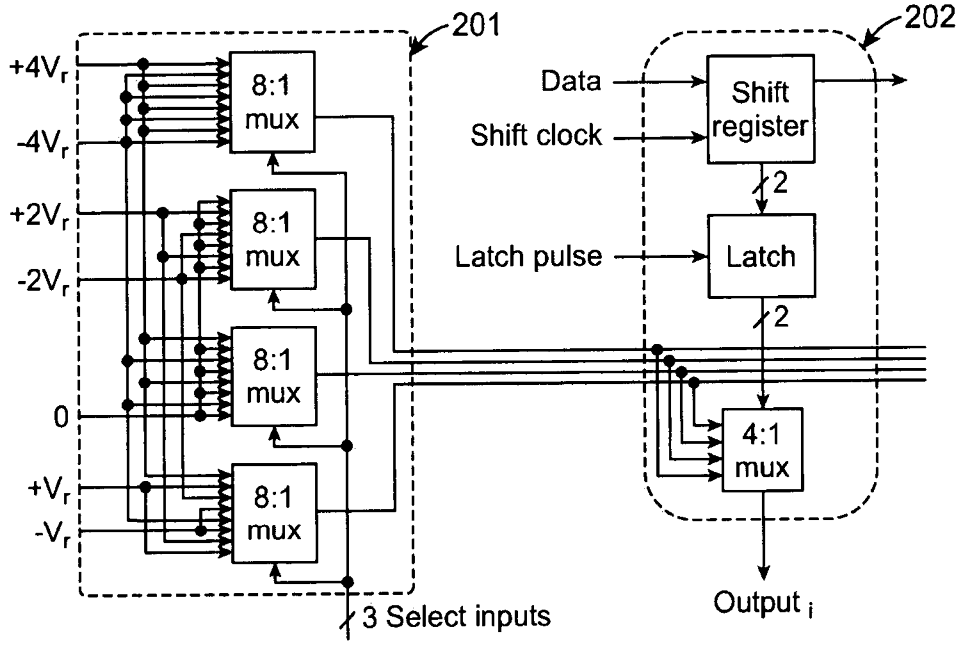
FIG. 2 shows the fact that "just four voltages are necessary at a given instant of time" is used to reduce the hardware complexity of the row drivers. A 2-bit shift register, 2-bit latch and a 4:1 analog multiplexer are adequate when four (8:1) analog multiplexers are common to all stages of the row drivers (one per each address line) as compared to a 3-bit shift register, 3-bit latch and 8:1 analog multiplexers that are necessary for each output of the row drivers.

The number of voltages in the scanning waveforms is seven viz., ±4 $V_r$; ±2 $V_r$; ±$V_r$ and 0. Data drivers that are capable of applying any one of the eight voltages to each electrode may be used. They consist of an 8:1 analog multiplexer, a 3-bit latch and 3-bit shift register in each stage that corresponds to one output of the driver. However, by considering the fact that just four voltages are necessary (three select voltages and a non-select voltage), it is adequate to have a 4:1 analog multiplexer, 2-bit latch and 2-bit shift register in each stage of the display driver along with row voltage selector (201) with four 8:1 analog multiplexers that are common to all the row drivers (202) in the display. The hardware reduction achieved in each stage of the driver contributes to a large reduction in the hardware complexity because the number of stages in the drivers is equal to N, the number of scanning electrodes in a display, and N is usually large. Hence, the reduction in hardware is significant while the increase in hardware (four 8:1 multiplexers) to achieve this reduction is negligible. Schematic diagram of a simplified row drive circuit is shown in FIG. 2.

2) Column (Data) Drivers

Figure 3:
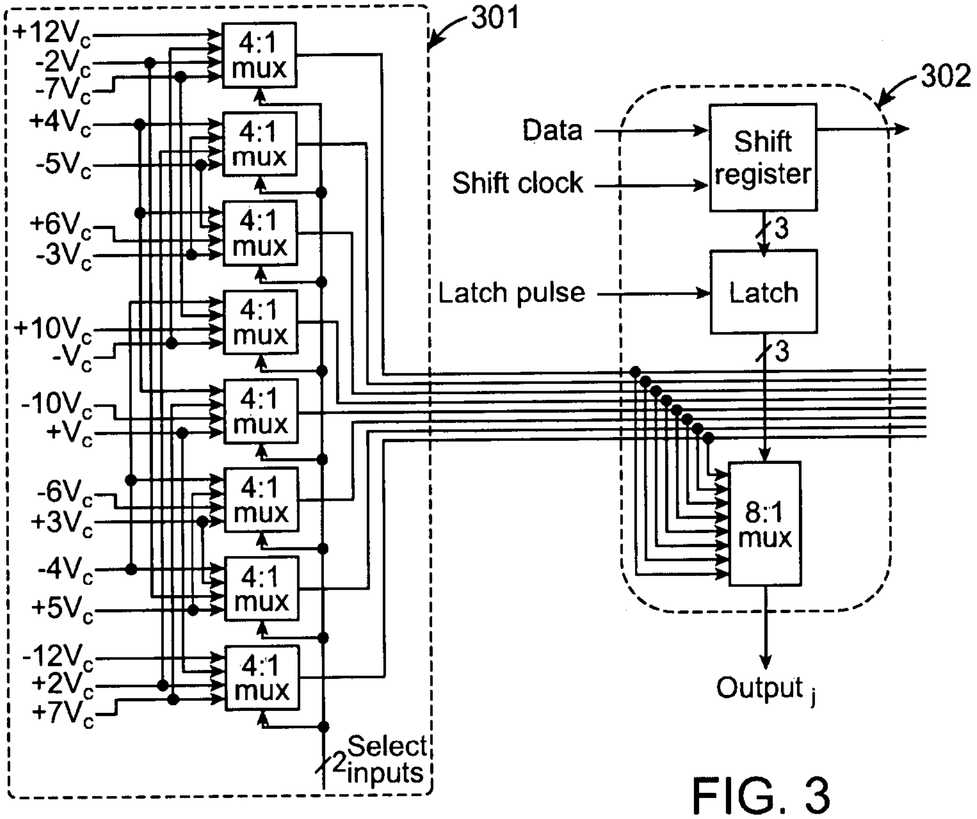
FIG. 3 shows the fact that "just eight voltages or less are necessary at a given instant of time" is used to reduce the hardware complexity of the column drivers. A 3-bit shift register, 3-bit latch and an 8:1 analog multiplexer are adequate when eight (4:1) analog multiplexers are shared by all the stages of the column drivers as compared to having a 5-bit shift register, a 5-bit latch and an (18:1) analog multiplexer for each output stage of the column (data) drivers.

Number of voltages in the data waveforms is either seventeen or eighteen depending on the selection of the matrix ((8) or (10)) for scanning the display. Hence, each stage of the column driver should have a (17:1) or a (18:1) analog multiplexer, a 5-bit latch to hold the value of the column data during the select time and a 5-bit shift register so that the column data can be serially shifted in to the driver. Here again the number of voltages that are necessary at a given instant of time is just four to eight depending on the select vector. Hence, LCD drivers that are capable of applying just eight voltage levels (with an 8:1 analog multiplexer, 3-bit latch and 3-bit shift register for each output) are adequate for the column driver (302), and the increase in hardware complexity due to the addition of column voltage selector (301) with eight 4:1 analog multiplexers that are common to all the stages in the driver is negligible because the number of data (column) electrodes is usually large. External multiplexers for the data drivers are shown in FIG. 3.

3) Controller

Gray shade data of the pixels in a matrix display is stored in the buffer memory as a one-dimensional array and the address of a pixel in 'row-i' and 'column-j' is computed as follows.

$$\text{Address}=(i-1)\cdot M+j-1 \quad (30)$$

Address of the four pixels in each column has to be generated repeatedly and a simple binary counter can be used provided the number of memory locations allocated for each row is an integer power of two and the number of electrodes that are in a set is also an integer power of two. By having four rows in a set, a binary counter can be used to generate the address without any multiplication and addition.

D. Implementation

Figure 4B:
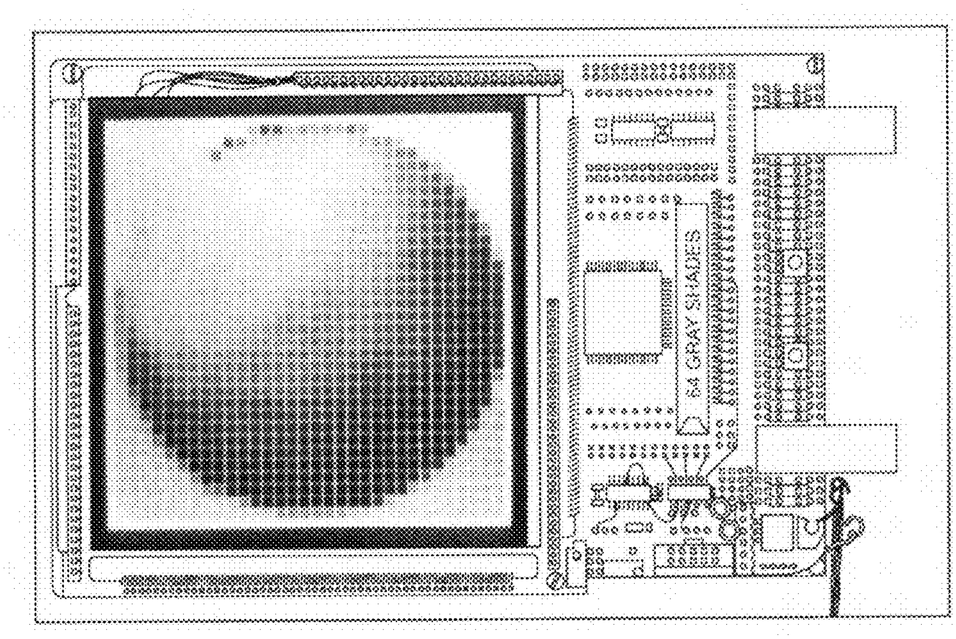
FIG. 4*b* shows a photograph of the prototype that is capable of displaying sixty-four gray shades using integer wavelets.
Figure 4A:
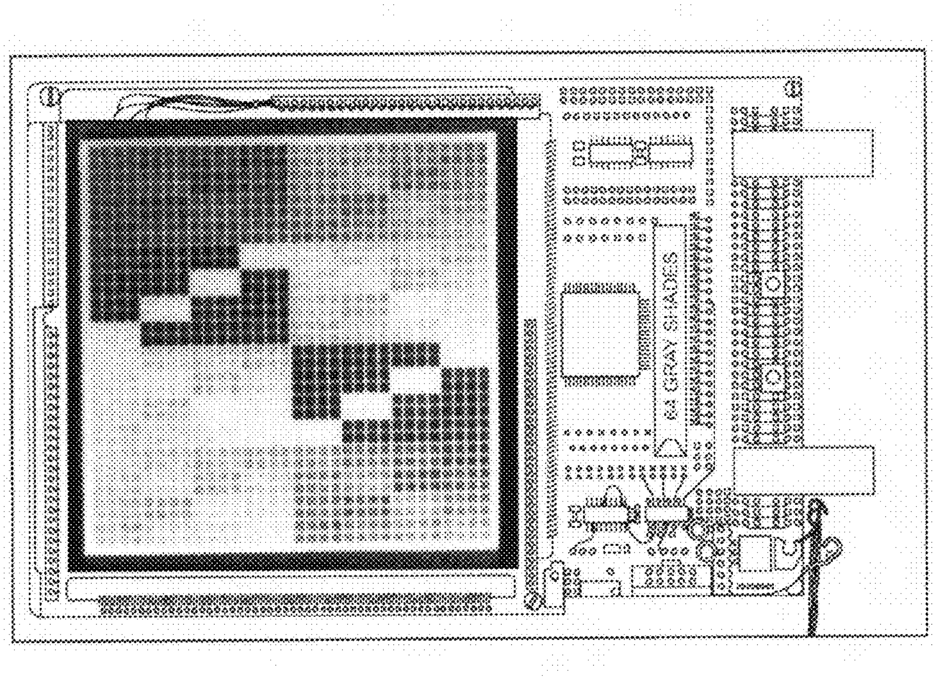
FIG. 4*a* shows a photograph of the prototype with sixty-four gray shades being displayed using integer wavelets.
Figure 5:
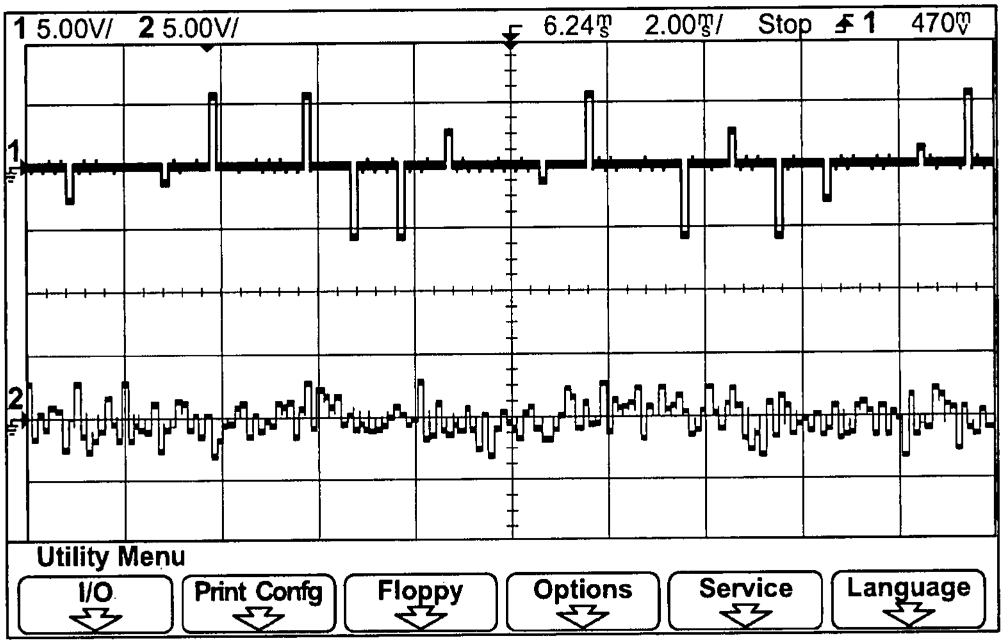
FIG. 5 shows typical row (scanning) and column (data) waveforms when sixty-four gray shades are displayed in a 32×32 matrix LCD. Just half a cycle has been captured on the screen for the sake of clarity.
Figure 6:
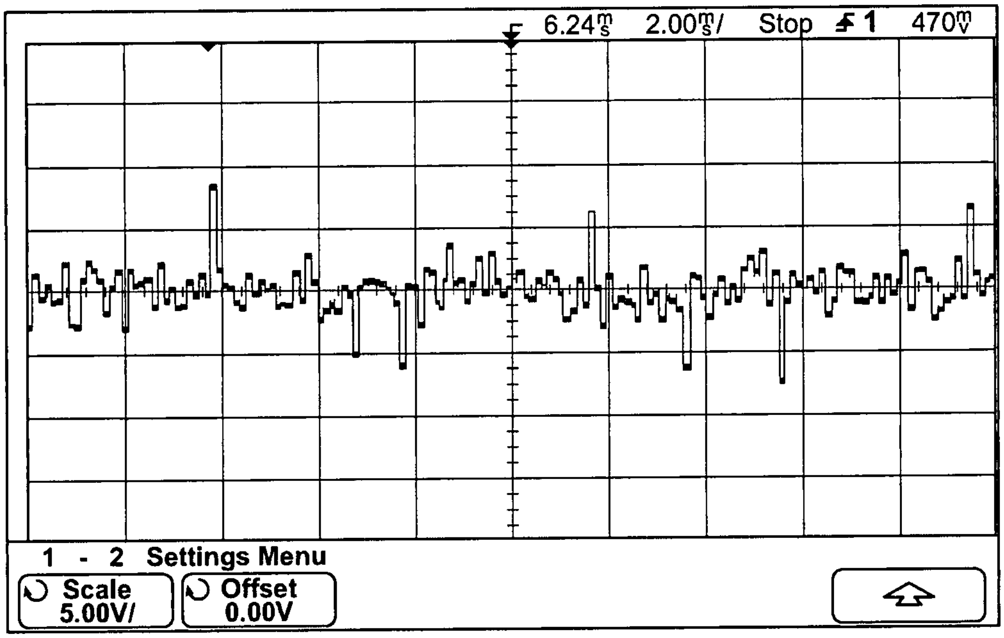
FIG. 6 shows a typical waveform across a pixel (row waveform minus the column waveform) in the prototype of the display capable of displaying sixty-four gray shades.

The wavelet matrix in (10) is used to scan a 32×32 twisted nematic matrix display. The number of voltages in the data waveform is eighteen instead of the seventeen for the matrix in (8). However, this does not change the hardware complexity of the data drivers because we have used drivers that are capable of applying one out of eight voltages. The controller is implemented in a CPLD with 84 macro-cells, 181 product terms and 55 registers. Photograph of the prototype is shown in FIG. 4. Typical row (scanning) and column (data) waveforms are shown in FIG. 5. Typical waveform across a pixel is shown in FIG. 6.

Comparison

Most of the techniques that were proposed by various researchers during the last century were primarily for displaying bi-level images. Number of time intervals to complete a cycle increases when frame modulation or pulse width modulation are employed to display gray shades. Number of time intervals in a cycle is (126N) when sixty-four gray shades are displayed using frame or pulse width modulation. The number of time intervals in a cycle includes polarity inversion to achieve DC free waveforms across the pixels. Number of time intervals for all the techniques in this comparison is the minimum number of time intervals to achieve DC free operation. On the other hand, number of voltages in the drive waveforms increases when amplitude modulation or pulse height modulation (A. R. Conner and T. J. Scheffer, Pulse-Height Modulation Gray Shading Methods for Passive Matrix LCDs, Proc. 12$^{th}$ International Display Research Conference (Japan Display '92) pp. 69-72, 1992) is used along with line-by-line and multi-line addressing techniques. Amplitude modulation will have 126 voltages in the column waveforms, three voltages in the data waveforms and it needs 4N time intervals to complete a cycle. A gray shade technique that is based on multi-ordered orthogonal matrix which was proposed by Yeung et al. (Steve Yeung, James Lee, Berry Lam, Jonathan Ng and Ivan Tsoi, Gray-scale addressing method by multi-order paraunitary/orthogonal building blocks, Journal of the SID 8/4, pp. 283-288, 2000) can display a large number of gray shades with fewer time intervals but the number of voltages in the data waveforms will be large. For example, thirty-five voltages in the data waveforms are necessary to display sixty-four gray shades although the number of voltages in scanning waveforms and the number of time intervals to complete a cycle are small (3 and 12N respectively). It is not possible to reduce the hardware complexity of the drive electronics if amplitude modulation, pulse height modulation (A. R. Conner and T. J. Scheffer, Pulse-Height Modulation Gray Shading Methods for Passive Matrix LCDs, Proc. 12$^{th}$ International Display Research Conference (Japan Display '92) pp. 69-72, 1992) and the technique based on multi-ordered orthogonal matrices (Steve Yeung, James Lee, Berry Lam, Jonathan Ng and Ivan Tsoi, Gray-scale addressing method by multi-order paraunitary/orthogonal building blocks, Journal of the SID 8/4, pp. 283-288, 2000) are used for displaying a large number of gray shades. Number of time intervals to complete a cycle will be too large if paraunitary matrices are used to display a large number of gray shades. It may be more appropriate to compare the wavelet-based technique with the successive approximation techniques (K. G. Panikumar and T. N. Ruckmongathan, Displaying Gray Shades in Passive Matrix LCDs Using Successive Approximation, Proceedings of the 7$^{th}$ Asian Symposium on Information Display (ASID-2002), pp. 229-232, 2002), (T. N. Ruckmongathan, 'A Successive Approximation Technique for Displaying Gray Shades in Liquid Crystal Displays (LCDs)', IEEE trans. Image Processing, Vol. 16, No. 2, pp. 554-561, February 2007) since both the techniques are based on delivering energies that are proportional to the bit weight of the gray shade data in several time intervals. A comparison of the wavelet-based technique with successive approximation techniques based on line-by-line addressing and multi-line addressing is given in Table I.

TABLE I

COMPARISON OF THE GRAY SHADE TECHNIQUES (64 GRAY SHADES)

| Parameter | Successive approximation technique (Line-by-line) | Successive approximation (MLA) - 4 lines in a subgroup | Wavelet based technique - 4 electrodes in a set |
|---|---|---|---|
| Number of time intervals for 64 gray shades | 12N | 12N | 8N |
| Supply voltage | High (100%)* | Intermediate (50%) | Low (40.8%) |
| Number of voltages in scanning waveforms | 13 (19 for IAPT) | 13 | 7 |
| Number of voltages in the data waveforms | 12 (19 for IAPT) | 17 | 17 |

*Supply voltage as a ratio is given as compared to successive approximation (line-by-line technique). Number is valid for N > 16 in case of SA-MLA and N > 9 in case of wavelet based technique.

Figure 7:
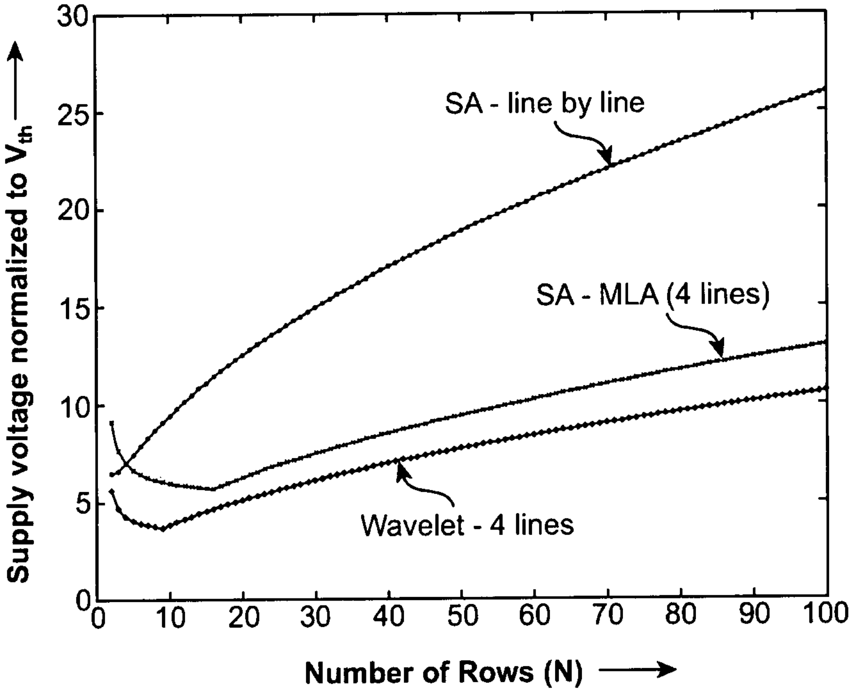
FIG. 7 shows a plot of supply voltage versus number of scanning electrodes to compare the successive approximation and wavelet-based techniques. Supply voltage for the wavelet-based technique is plotted using the expression in (28).
Figure 8:
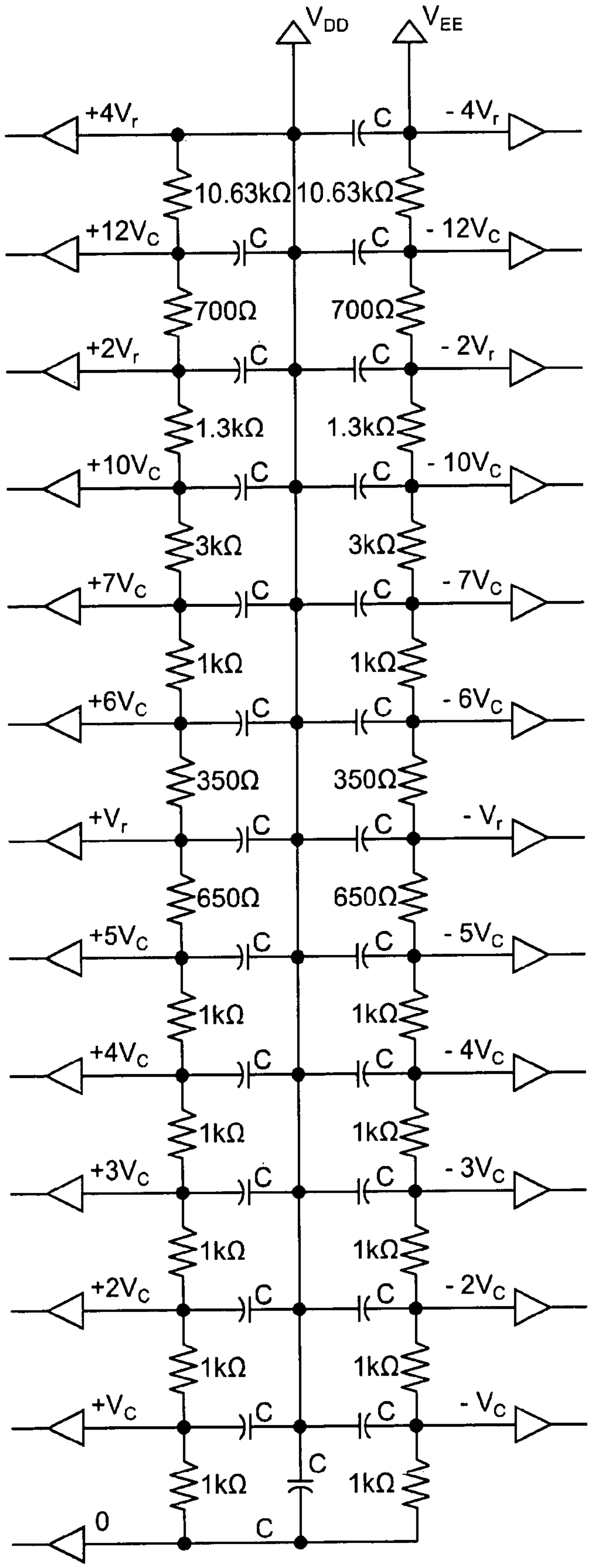
FIG. 8 shows a typical voltage level generator.

The number of rows is chosen to be four in case of multi-line addressing. The number of time intervals to complete a cycle is less for the wavelet-based technique and hence the display can be scanned at a lower rate as compared to the successive approximation technique when all other parameters are equal. Slow scanning is helpful to reduce the power consumption. The brightness non-uniformity of pixels due to distortion in the addressing waveforms will also be less because the select time is larger when the number of time intervals is small. A lower supply voltage of the wavelet-based technique is advantageous in portable devices. Supply voltage of the wavelet-based technique is compared with that of the successive approximation techniques (K. G. Panikumar and T. N. Ruckmongathan, Displaying Gray Shades in Passive Matrix LCDs Using Successive Approximation, Proceedings of the 7$^{th}$ Asian Symposium on Information Display (ASID-2002), pp. 229-232, 2002), (T. N. Ruckmongathan, 'A Successive Approximation Technique for Displaying Gray Shades in Liquid Crystal Displays (LCDs)', IEEE trans. Image Processing, Vol. 16, No. 2, pp. 554-561, February 2007) in FIG. 7. It is possible to reduce the hardware complexity of the drive electronics in successive approximation technique and the technique proposed in this disclosure. LCD drivers that are used for displaying bi-level images can be used for displaying gray shades by adding some multiplexers that are common to all the drivers for the successive approximation techniques (T. N. Ruckmongathan, 'A Successive Approximation Technique for Displaying Gray Shades in Liquid Crystal Displays (LCDs)', IEEE trans. Image Processing, Vol. 16, No. 2, pp. 554-561, February 2007). Response of the display for switching to different gray shades was measured using a cell (3.9 μm) filled with RO-TN 403 (liquid crystal mixture) when thirty-two rows are scanned with waveforms derived from the wavelet matrix in (10). The refresh rate is 50 Hz. Table II and Table III show the response times in milliseconds when the pixels are switched from one gray shade to another using the wavelet-based technique. Rise time and fall times are measured from 10% to 90% change in transmission of the difference in transmission between two states. The upper triangle in this table shows the rise times and the lower triangle gives the fall times. Response of the cell was also measured when it is switched to ON and OFF states using voltages under multiplexed condition, by applying square waveforms with RMS voltage equal to $V_{ON}$ (1.58 volts) and $V_{OFF}$ (1.33 volts, the threshold of the liquid crystal mixture) for the sake of comparison. Switch ON (rise) and switch OFF (fall) times were 53 and 34 ms respectively. The cell is not optimized for fast response. From the Tables II and III it is evident that the response times are slightly higher under multiplexed condition when the pixels are switched from one extreme to the other extreme state (i.e. ON and OFF). However, the gray scale to gray scale switching can be high by a factor of about 2.5 in some cases with conventional addressing methods.

CONCLUSION

Salient features of the wavelet-based techniques are as follows:

1. Amplitude and the number of time intervals in the wavelets are selected with an aim to reduce the supply voltage of the drive electronics.
2. A compact wavelet matrix is constructed to reduce the number of time intervals in a cycle.
3. Number of non-zero elements in the select vector is chosen to reduce the hardware complexity of the drivers.
4. Number of non-zero elements in the select vector may also be used to match the drivers on a given display panel.
5. Number of rows in the wavelet matrix can be chosen to be an integer power of two to reduce the hardware complexity of the controller.

These features are unique to the wavelet-based technique and hence they have several advantages as compared to the conventional techniques for displaying gray shades.

TABLE II

RESPONSE TIMES (IN MILLISECONDS) WHEN PIXELS ARE SWITCHED TO DIFFERENT GRAY SHADES USING WAVELETS ($V_{SUPPLY}$ = 8.78 V).

| Gray shade value | 0 (OFF) | 3 | 7 | 11 | 15 | 19 | 23 | 27 | 31 | 35 | 39 | 43 | 47 | 51 | 55 | 59 | 63 (ON) |
|---|---|---|---|---|---|---|---|---|---|---|---|---|---|---|---|---|---|
| 0 (OFF) | — | 124 | 118 | 118 | 114 | 105 | 102 | 98 | 95 | 92 | 96 | 90 | 88 | 87 | 85 | 78 | 74 |
| 3 | 96 | — | 120 | 112 | 114 | 100 | 96 | 91 | 88 | 85 | 82 | 82 | 80 | 74 | 73 | 71 | 70 |
| 7 | 92 | 100 | — | 120 | 116 | 100 | 97 | 93 | 90 | 88 | 83 | 86 | 87 | 85 | 80 | 70 | 68 |
| 11 | 90 | 98 | 99 | — | 118 | 112 | 102 | 98 | 96 | 90 | 94 | 88 | 84 | 80 | 76 | 72 | 66 |
| 15 | 85 | 90 | 92 | 104 | — | 115 | 110 | 101 | 97 | 95 | 90 | 93 | 90 | 82 | 79 | 74 | 71 |
| 19 | 79 | 86 | 88 | 100 | 105 | — | 116 | 112 | 106 | 100 | 93 | 94 | 90 | 84 | 80 | 74 | 73 |
| 23 | 70 | 79 | 84 | 94 | 98 | 104 | — | 114 | 115 | 108 | 98 | 95 | 92 | 85 | 81 | 76 | 75 |
| 27 | 70 | 72 | 78 | 92 | 93 | 98 | 108 | — | 122 | 120 | 116 | 99 | 94 | 87 | 83 | 77 | 76 |
| 31 | 67 | 70 | 75 | 88 | 91 | 96 | 100 | 110 | — | 126 | 112 | 104 | 98 | 89 | 86 | 82 | 82 |
| 35 | 65 | 77 | 78 | 89 | 88 | 92 | 96 | 104 | 110 | — | 120 | 112 | 102 | 96 | 93 | 88 | 86 |
| 39 | 62 | 72 | 74 | 85 | 86 | 87 | 88 | 106 | 100 | 108 | — | 119 | 116 | 107 | 103 | 92 | 88 |
| 43 | 68 | 70 | 75 | 80 | 80 | 84 | 85 | 88 | 90 | 103 | 114 | — | 113 | 109 | 106 | 97 | 89 |
| 47 | 62 | 64 | 70 | 76 | 80 | 78 | 82 | 83 | 86 | 90 | 98 | 104 | — | 115 | 108 | 101 | 93 |
| 51 | 62 | 64 | 70 | 74 | 78 | 79 | 76 | 75 | 84 | 82 | 96 | 100 | 104 | — | 114 | 98 | 95 |
| 55 | 55 | 65 | 71 | 78 | 76 | 77 | 69 | 74 | 82 | 78 | 92 | 95 | 101 | 107 | — | 116 | 105 |
| 59 | 50 | 68 | 65 | 74 | 75 | 70 | 66 | 72 | 80 | 74 | 86 | 84 | 94 | 92 | 102 | — | 118 |
| 63 (ON) | 58 | 65 | 60 | 72 | 77 | 72 | 68 | 70 | 76 | 69 | 75 | 80 | 88 | 91 | 95 | 108 | — |

The upper triangle in the table gives the rise time and the lower triangle of the table gives the fall time when the pixels are switched from one gray shade to another.

Rise time and fall times are measured from 10% to 90% change in transmission of the difference in transmission between two states.

TABLE III

RESPONSE TIMES (IN MILLISECONDS) WHEN PIXELS ARE SWITCHED TO DIFFERENT GRAY SHADES USING WAVELETS ($V_{SUPPLY}$ = 8.36 V).

| Gray shade value | 0 (OFF) | 3 | 7 | 11 | 15 | 19 | 23 | 27 | 31 | 35 | 39 | 43 | 47 | 51 | 55 | 59 | 63 (ON) |
|---|---|---|---|---|---|---|---|---|---|---|---|---|---|---|---|---|---|
| 0 (OFF) | — | 132 | 130 | 121 | 125 | 120 | 116 | 110 | 106 | 102 | 95 | 94 | 80 | 86 | 85 | 77 | 66 |
| 3 | 58 | — | 138 | 130 | 124 | 118 | 114 | 115 | 116 | 114 | 110 | 106 | 94 | 88 | 82 | 78 | 74 |
| 7 | 60 | 80 | — | 130 | 128 | 125 | 120 | 116 | 106 | 100 | 100 | 103 | 100 | 94 | 90 | 82 | 79 |
| 11 | 52 | 72 | 96 | — | 129 | 124 | 120 | 118 | 115 | 108 | 104 | 110 | 108 | 95 | 93 | 86 | 84 |
| 15 | 56 | 68 | 90 | 100 | — | 122 | 116 | 120 | 115 | 112 | 110 | 114 | 110 | 104 | 96 | 88 | 86 |
| 19 | 60 | 70 | 80 | 92 | 108 | — | 128 | 124 | 122 | 116 | 110 | 100 | 100 | 88 | 86 | 74 | 78 |
| 23 | 48 | 65 | 72 | 88 | 104 | 116 | — | 128 | 115 | 118 | 108 | 116 | 112 | 106 | 102 | 92 | 90 |
| 27 | 62 | 67 | 70 | 90 | 96 | 110 | 116 | — | 132 | 128 | 114 | 110 | 96 | 84 | 88 | 86 | 80 |
| 31 | 55 | 65 | 66 | 90 | 93 | 98 | 110 | 120 | — | 130 | 126 | 115 | 106 | 108 | 102 | 90 | 88 |
| 35 | 51 | 68 | 67 | 88 | 89 | 95 | 110 | 120 | 123 | — | 128 | 110 | 104 | 96 | 94 | 85 | 84 |
| 39 | 58 | 66 | 71 | 78 | 86 | 84 | 104 | 108 | 120 | 116 | — | 132 | 113 | 98 | 95 | 87 | 86 |
| 43 | 60 | 65 | 70 | 80 | 84 | 85 | 102 | 98 | 100 | 95 | 120 | — | 124 | 116 | 100 | 88 | 90 |
| 47 | 50 | 65 | 72 | 78 | 84 | 80 | 95 | 82 | 94 | 88 | 100 | 111 | — | 120 | 116 | 96 | 92 |
| 51 | 50 | 60 | 60 | 70 | 80 | 83 | 94 | 84 | 92 | 75 | 89 | 88 | 112 | — | 125 | 110 | 92 |
| 55 | 55 | 56 | 58 | 70 | 80 | 82 | 90 | 82 | 88 | 72 | 88 | 80 | 110 | 118 | — | 115 | 100 |
| 59 | 49 | 56 | 60 | 66 | 77 | 73 | 80 | 78 | 84 | 70 | 76 | 73 | 92 | 96 | 100 | — | 118 |
| 63 (ON) | 47 | 48 | 60 | 66 | 74 | 70 | 66 | 74 | 80 | 75 | 70 | 73 | 82 | 90 | 90 | 110 | — |

The invention is further elaborated with the following example, however these examples should not be considered to limit the scope of the invention. Below shows an example of using slant wavelet instead of Haar wavelet.

Slant Wavelets and Construction of a Wavelet Matrix

A wavelet slant matrix proposed by S. Agaian, K. Tourshan and J. P. Noonan, "Generalized parametric Slant-Hadamard transform", Signal Processing 84 (2004), pp. 1299-1306, is shown in (31).

$$S_3 = \begin{bmatrix} 1 & 1 & 1 \\ \frac{\sqrt{6}}{2} & 0 & -\frac{\sqrt{6}}{2} \\ \frac{\sqrt{2}}{2} & -\sqrt{2} & \frac{\sqrt{2}}{2} \end{bmatrix} \quad (31)$$

Five wavelets are derived from the wavelet matrix $S_3$ and they satisfy the following conditions:

1. Energy of a wavelet is proportional to weight of a bit of the gray shade data.
2. Each wavelet is uniquely associated with one bit of the data.
3. DC free wavelets to ensure long life of the display (application of DC voltages for a long duration will reduce the life of the display).

Five wavelets that satisfy these conditions are shown in (32) to (36).

$$w_{B4}=\{+4,+4,+4,-4,-4,-4,\}(32)$$

$$w_{B3}=\{+2\sqrt{6},0,-2\sqrt{6}\} \quad (33)$$

$$w_{B2}=\{+2\sqrt{3},0,-2\sqrt{3}\} \quad (34)$$

$$w_{B1}=\{+\sqrt{2},-2\sqrt{2},+\sqrt{2}\} \quad (35)$$

$$w_{B0}=\{+1,-2,+1\} \quad (36)$$

These wavelets are more complex as compared to the Haar wavelet. However, use of these wavelets does not increase the hardware complexity of the drive electronics as explained here. Energies of these wavelets are 96, 48, 24, 12 and 6 respectively and they are proportional (×6) to the weight of bits in gray shade data. Subscripts B4 to B0 in (32) to (36) correspond to the binary weight of the gray shade data as shown in the following expression.

$$g_{i,j} = \sum_{k=0}^{4} 2^k \cdot d_k;\ d_k = \begin{cases} +1 & \forall \text{ logic } 0 \\ -1 & \forall \text{ logic } 1 \end{cases} \quad (37)$$

Values of the gray shades $g_{i,j}$ from −31 to +31 and adjacent gray shade values differ by 2. Wavelet matrices can be constructed with the wavelets in (32) to (36) and one such matrix is shown in (38).

$$O_{4\times 6} = \begin{bmatrix} +4 & -4 & +4 & -4 & +4 & -4 \\ +2\sqrt{6} & 0 & 0 & 0 & -2\sqrt{6} & 0 \\ 0 & +2\sqrt{3} & 0 & 0 & 0 & -2\sqrt{3} \\ +\sqrt{2} & +1 & -2\sqrt{2} & -2 & +\sqrt{2} & +1 \end{bmatrix} \quad (38)$$

Number of rows in the wavelet matrix is chosen to be four to reduce the hardware complexity of the controller as explained before. Several wavelet matrices can be obtained by using the wavelets in (32) to (36). A wavelet matrix with three rows is shown in (39).

$$O_{3\times 6} = \begin{bmatrix} +4 & +4 & +4 & -4 & -4 & -4 \\ +2\sqrt{6} & 0 & -2\sqrt{6} & +2\sqrt{3} & 0 & -2\sqrt{3} \\ +\sqrt{2} & -2\sqrt{2} & +\sqrt{2} & +1 & -2 & +1 \end{bmatrix} \quad (39)$$

Columns of the wavelet matrix are referred to as the select vectors. Each element of the select vector corresponds to a bit of the gray shade data ($d_i$). Data bits corresponding to the elements of the matrices in (38) and (39) are shown in (40) and (41) respectively.

$$D_{4\times 8} = \begin{bmatrix} d_4 & d_4 & d_4 & d_4 & d_4 & d_4 \\ d_3 & x & x & x & d_3 & x \\ x & d_2 & x & x & x & d_2 \\ d_1 & d_0 & d_1 & d_0 & d_1 & d_0 \end{bmatrix} \quad (40)$$

$$D_{3\times 6} = \begin{bmatrix} d_4 & d_4 & d_4 & d_4 & d_4 & d_4 \\ d_3 & x & d_3 & d_2 & x & d_2 \\ d_1 & d_1 & d_1 & d_0 & d_0 & d_0 \end{bmatrix} \quad (41)$$

The 'x' in data bit matrices corresponds to the zero in the wavelet matrices.

Technique Using Slant Wavelet

Consider a matrix display with N and M electrodes that are orthogonal to each other and picture elements (pixels) located at the intersection of these address lines. Let the gray shade of a pixel located at the intersection of row 'i' and column 'j' be $g_{i,j}$ as given in (37). Address lines in the matrix display are grouped into (N/4) sets such that each set consists of four address lines. Steps involved in scanning the matrix display are as follows:

1. A column in the wavelet matrix (one of the select vectors) in (38) is chosen to select a set of address lines.
2. Data vector of each column in the matrix display is obtained by selecting the data bits corresponding to the select vector (as shown in the corresponding column of the data bit matrix (40)).
3. Data voltages (dot product of the select vector with the data vectors) are computed. For example, the data voltage when the select vector is the first column of the wavelet matrix in (38) is as follows:

$$V_{data} = \begin{bmatrix} +4 \\ +2\sqrt{6} \\ 0 \\ +\sqrt{2} \end{bmatrix} \cdot \begin{bmatrix} d_4 \\ d_3 \\ 0 \\ d_1 \end{bmatrix} \cdot V_c \quad (42)$$

Here, $d_4$, $d_3$ and $d_1$ correspond to pixels in the first, second and fourth address lines of the selected subset. Subscripts (4 to 0) correspond to bits, i.e. the most significant bit (MSB) to the least significant bit (LSB).

4. Four address lines in a set are selected simultaneously for a time duration T (referred to as the select time) with voltages corresponding to one of the select vector. For example, the address lines are selected by applying the voltages $+4\,V_r$, $+2\sqrt{6}\,V_r$ and $+\sqrt{2}\,V_r$ to the first to fourth address lines in a set when the first column of the wavelet matrix is the select vector.

5. Both select and data voltages are applied to the corresponding electrodes simultaneously for a duration T, referred to as the select interval (T).
6. Select vector and the corresponding data vector are rotated (either up or down) vertically by one position. Three select vectors can be obtained by three successive rotations of a select vector in (38). Hence, the total number of select vectors is 24 (6×4).
7. The new select vector that is obtained by rotating a select vector in (38) is used to select either the same address lines or another set of address lines for a duration T as described in steps 3 and 4.
8. A cycle is complete when all the set of address lines in the matrix display are selected with all the (24) select vectors, i.e. six basic vectors and the eighteen vectors derived by rotating them.

Figure 9:
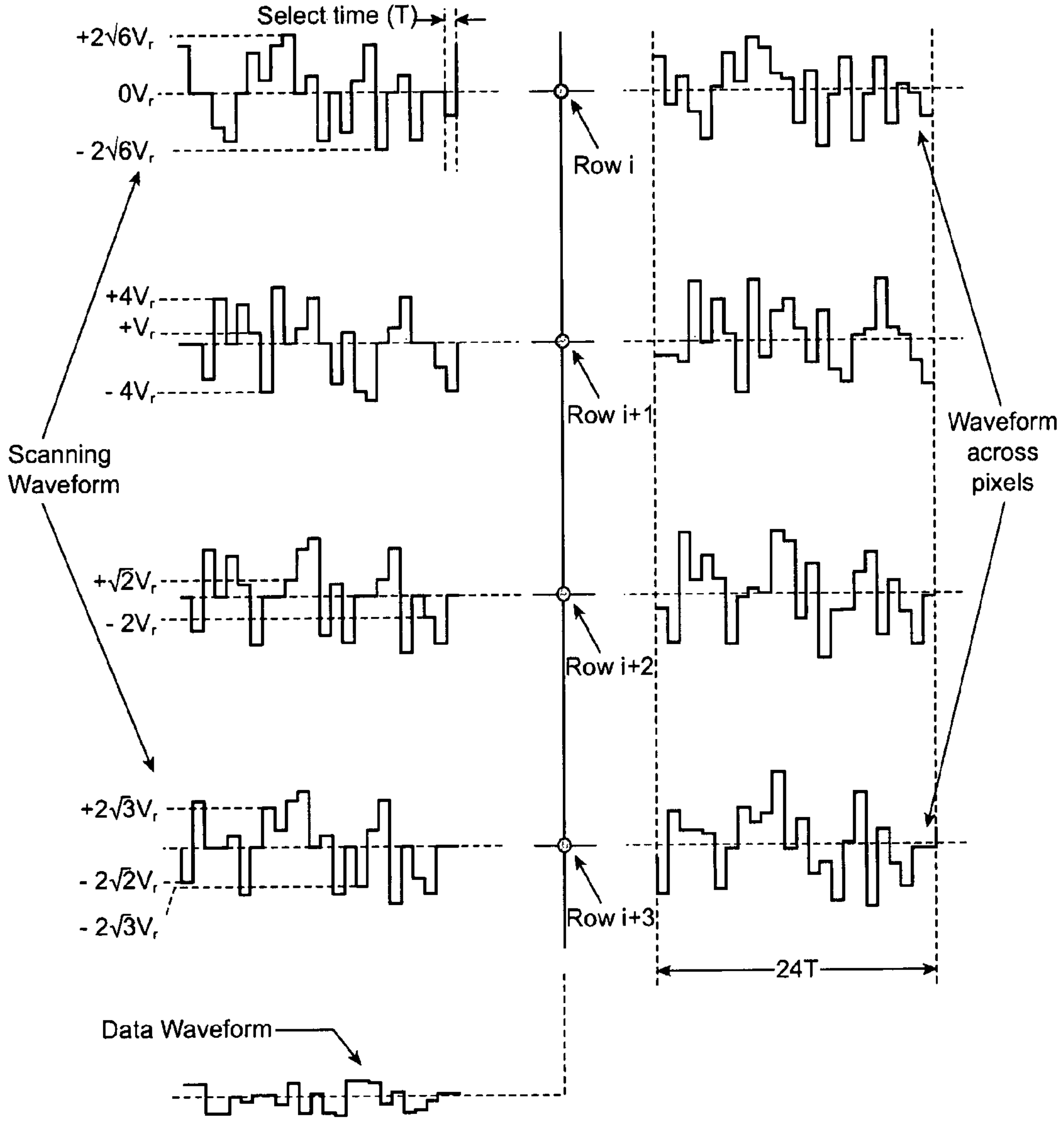
FIG. 9 shows typical waveforms when slant (non-integer) wavelets are used to scan the RMS responding matrix displays. The scanning and the data waveforms have nine and eighteen voltages respectively.

The display is refreshed continuously by repeating this cycle at a rate that is fast enough to avoid flicker and ensure RMS response. Scanning sequence described here ensures that all the address lines in the matrix display are selected with the five wavelets once in each cycle. Waveforms across the pixels will be DC free because the wavelets are DC free. Typical waveforms of the addressing technique are shown in FIG. 9. Number of time intervals to complete a cycle is about 6N. Analysis of this technique is presented in the next section.

Analysis for Slant Wavelet

RMS voltage across a pixel when the matrix display is scanned with waveforms corresponding to the wavelet matrix in (38) is as follows:

$$V_{pixel}(RMS) = \sqrt{\frac{6\sum_{k=0}^{4} 2^k (V_r^2 - 2\cdot d_{k,i,j} V_r \cdot V_c + N \cdot V_c^2)}{6N}} \tag{43}$$

$$V_{ON}(RMS) = \sqrt{\frac{31(V_r^2 + 2V_r \cdot V_c + N \cdot V_c^2)}{N}} \tag{44}$$

$$V_{OFF}(RMS) = \sqrt{\frac{31(V_r^2 - 2V_r \cdot V_c + N \cdot V_c^2)}{N}} \tag{45}$$

Ratio of RMS voltage across the ON pixels to that across OFF pixels is called the selection ratio. It is a measure of the performance of the addressing technique, and a high selection ratio is preferred to achieve a high contrast in the display. It is a maximum when:

$$\frac{V_r}{V_c} = \sqrt{N} \tag{46}$$

$$\text{Maximum selection ratio} = \sqrt{\frac{\sqrt{N}+1}{\sqrt{N}-1}} \tag{47}$$

It is the maximum selection ratio that is achievable by any addressing technique employed for driving the RMS responding passive matrix LCDs. A good contrast is obtained when the RMS voltage across the OFF pixels in the display is biased near the threshold voltage of the LCD. The voltage $V_c$ is obtained by equating the voltage across OFF pixels to the threshold voltage ($V_{threshold}$) of the liquid crystal display.

$$V_{OFF} = \sqrt{\frac{31(2N - 2\sqrt{N})}{N}} \cdot V_c = V_{threshold} \tag{48}$$

$$\text{Hence, } V_c = \frac{V_{threshold}}{\sqrt{62\left(1 - \frac{1}{\sqrt{N}}\right)}} \tag{49}$$

Supply voltage of the drive electronics is determined by the maximum swing in the addressing waveforms. Amplitude of the scanning waveforms increases and the data waveforms decrease as the number of address lines that are multiplexed is increased in multi-line addressing techniques. Hence, the expression for the supply voltage when N is small is determined by the maximum swing in the data waveforms whereas the supply voltage is determined by the maximum swing in the scanning waveforms when N is large.

Maximum amplitudes of the data waveforms and scanning waveforms are as follows:

$$\text{Data voltage (max)} = (2\sqrt{6} + 4 + \sqrt{2}) \cdot V_c \tag{50}$$

$$\text{Scanning voltage (max)} = 2\sqrt{6}\sqrt{N} \cdot V_c \tag{51}$$

Hence, supply voltage of the drive electronics is as follows.

$$V_s = \begin{cases} (\sqrt{96} + 8 + \sqrt{8})V_c & \forall\ N < 5 \\ \sqrt{96N}\,V_c & \forall\ N \geq 5 \end{cases} \tag{52}$$

Supply voltage for most practical values (N>5) is given in (53).

$$\text{Supply voltage}_{(N\geq 5)} = \frac{\sqrt{96N}}{\sqrt{62\left(1 - \frac{1}{\sqrt{N}}\right)}} V_{threshold} \tag{53}$$

Figure 10:
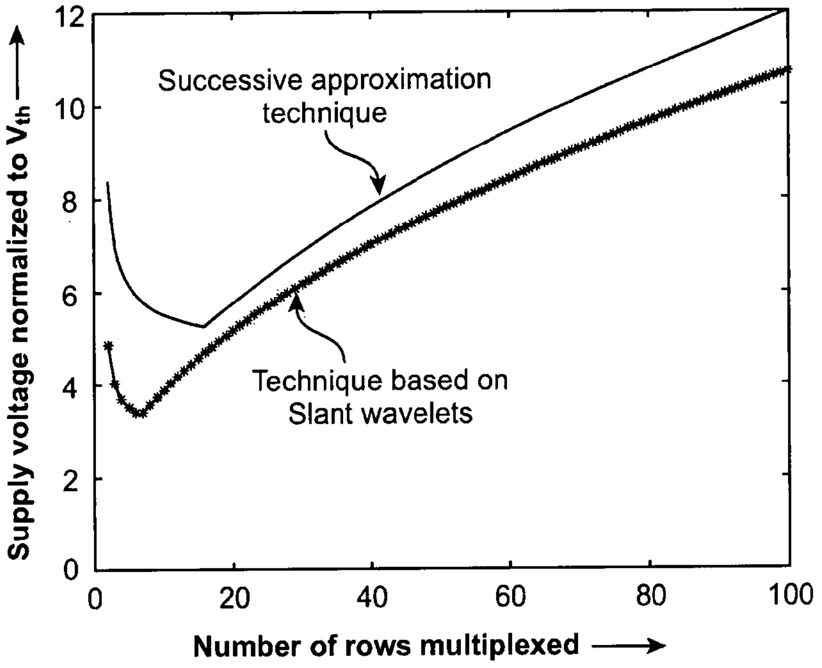
FIG. 10 shows supply voltages of the technique based on slant wavelets as compared with that of the successive approximation technique.

A plot of the supply voltage for this range is shown in FIG. 10.

Analysis presented in this paper is independent of the scanning sequence, the order in which the scanning electrodes are selected with select vectors. There are 24! possible ways of selecting four address lines (a set) with the 24 select vectors. The (N/4) sets (of address lines) themselves can be chosen in any one of the (N/4)! ways. Although there are many possible ways of selecting the address lines, the RMS voltage across the pixels will be the same as long as the RC time constant of the drive circuit is small as compared to the select time T. Drive waveforms will get distorted (due to the 'ON' resistance of the drivers and the capacitance of the pixels) whenever there is a transition in the waveforms. Number of transitions in the addressing waveforms is determined by the scanning sequence. In case the RC time constant is large, then RMS voltages across the pixels will be less due to distortion in the waveforms. Number of transitions in the addressing waveforms also determines the power dissipated in the drivers and it is also preferable to have smaller amplitude of transitions to reduce the power consumption. Frequency spectrum across the pixels is also determined by the addressing sequence.

Hardware Complexity of the Drive Electronics for Slant Wavelet

A. Reducing Hardware Complexity of the Row Drivers

Number of non-zero elements in each column of the wavelet matrix in (38) is intentionally restricted to just three to reduce the hardware complexity of the row drivers. Number of voltages in the scanning waveforms is just four at a given instant of time (out of the eleven possible values) viz. +4, $+2\sqrt{6}$, $+2\sqrt{3}$, $+\sqrt{2}$, +1, 0, −2, $-2\sqrt{2}$, $-2\sqrt{3}$, $-2\sqrt{6}$ and −4. Hence it is adequate to have the following elements in each stage (corresponding to one output) of the row driver (111) integrated circuit (IC):

1. A stage of the 2-bit shift register to enable serial transfer of data in to the driver IC.
2. A 2-bit latch to hold the data stable during a select time (and allow serial transfer of the data in the shift register) so that the desired voltage can be applied to the address lines. One of the four voltages that correspond to 0 in the wavelet matrix is also the non-select voltage.
3. 4:1 analog multiplexer to select one of the four voltages on the internal bus of the driver IC. Select input of the multiplexer is the output of the 2-bit latch of same stage.

Figure 11:
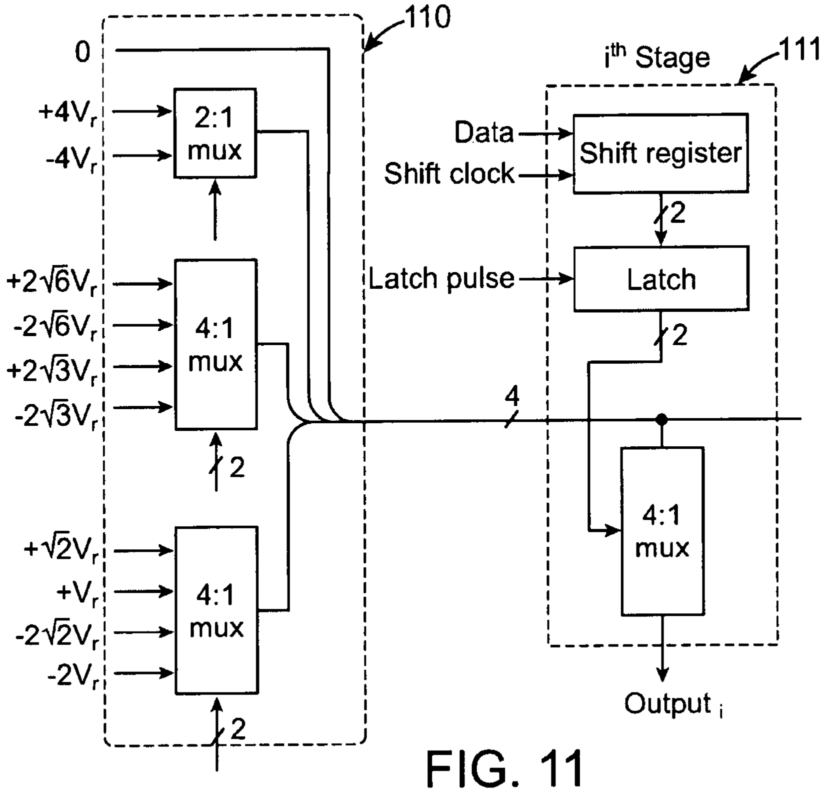
FIG. 11 shows one stage ('i') of the row drivers having (4:1) analog multiplexer, 2-bit latches, and a stage of the 2-bit shift register (to shift in the data serially) is shown inside the box. Two 4:1 analog multiplexers and a 2:1 analog multiplexer that are common to all the stages of the row drivers are useful to reduce the hardware complexity of the row driver circuit.

Two 4:1 analog multiplexers and a 2:1 analog multiplexer are provided to reduce the hardware complexity of the drivers. These row voltage selectors (110) are common to all stages of the row drivers. They connect the three non-zero select voltages to the voltage bus in the row drivers and they may be located outside the data drivers ICs because multiple numbers of driver ICs may be used in the displays. A block diagram of the row driver circuit that can be used to scan the display is shown in FIG. 11. Hardware complexity of the shift register, latch and multiplexer is reduced by 50%, 50% and 64% respectively as compared to using a driver that is capable of selecting one out of nine voltages using 4-bit shift register, 4-bit latches and 11:1 analog multiplexers in the driver IC. Addition of three multiplexers (as shown in FIG. 11) does not increase the hardware complexity of the drive circuit significantly because the number of rows (N) in the matrix display is usually large.

B. Reducing Hardware Complexity of the Column Drivers

Figure 12:
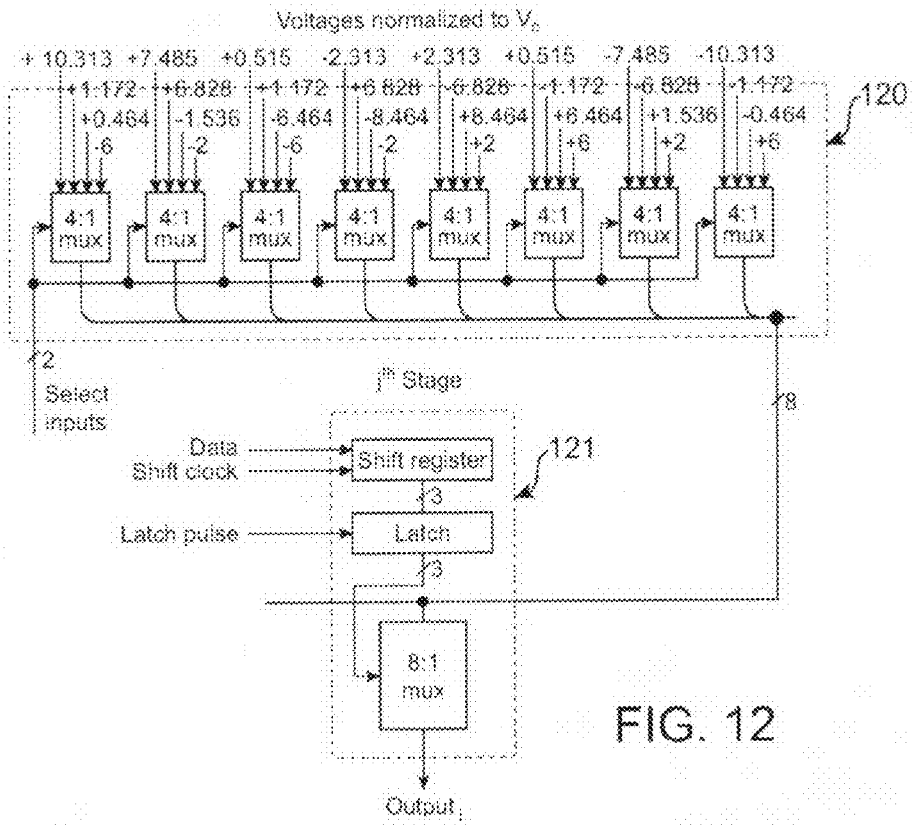
FIG. 12 shows drivers with 3-bit shift register, 3-bit latch and 8:1 analog multiplexers are used as the column drivers considering the fact that the number of voltages corresponding to each select vector is either 8 or 4 although the number of voltages in the data (column) waveforms is 24. Eight 4:1 analog multiplexers that are common to all the stages of the data drivers are used to avoid using drivers with 5-bit shift register, 5-bit latch and 24:1 analog multiplexers. Input voltages to the eight (4:1) multiplexers are normalized to $V_c$.

Number of voltages in the column (data) waveforms is 24 and a 5-bit shift register, 5-bit latch and 24:1 analog multiplexers may be used to generate the column (data) waveforms. However, just four or eight voltages are necessary at a given instant of time depending on the number of non-zero elements (one or two) in the select vector. Hardware complexity of the column drivers can be reduced by using column voltage selector (120) with eight 4:1 analog multiplexers that are common to all the data drivers along with column driver (121) ICs (with 3-bit shift register, 3-bit latches and 8:1 analog multiplexers in each stage) that are capable of applying any one of the eight voltages depending on 3-bits of data. Hardware complexity is reduced by 40%, 40% and 66% for the shift register, latches and analog multiplexers respective in the column drivers. The increase in hardware complexity due to the eight 4:1 multiplexers is not significant because the number of columns (data electrodes) in a display is usually large. A block diagram of the column driver circuit is shown in FIG. 12.

C. Generation of Data for the Column Driver

Although the column voltage is proportional to the dot product of the select vector and the data vector, it is not necessary to compute this dot product repeatedly while scanning the display. Result of the dot product of a select vector with any data vector is just one of the eight or four values for the following reasons.

1. Number of unique select vectors is limited; the rotated versions of a select vector and the select vectors whose elements differ only in sign and not in magnitude are not considered to be unique. For example, the vectors in the following equations are not unique.

$$\begin{bmatrix} -4 \\ 0 \\ +2\sqrt{3} \\ +1 \end{bmatrix}; \begin{bmatrix} +1 \\ -4 \\ 0 \\ +2\sqrt{3} \end{bmatrix}; \begin{bmatrix} -4 \\ 0 \\ -2\sqrt{3} \\ +1 \end{bmatrix}, \begin{bmatrix} -2\sqrt{3} \\ +1 \\ -4 \\ 0 \end{bmatrix} \ldots \text{etc.} \quad (54)$$

2. Number of non-zero elements in the select vectors is either three or two to reduce the hardware complexity of the column (data) drivers.
3. Elements of the data vectors are either +1 or −1 because they correspond to just one bit of the data.

Number of unique select vectors in the wavelet matrix of (38) is just four. Here again it is enough to compute these values during design of the voltage level generator (VLG). Voltages from the VLG are inputs to the eight 4:1 analog multiplexers that are common to all column driver ICs. Outputs of the multiplexers are connected to the voltage bus in the column drivers. These eight multiplexers select voltages corresponding to one of the four unique select vectors. The data bits corresponding to the non-zero elements are shifted in to column driver to select one of the eight voltages in the bus. Hence it is not necessary to compute the dot product, and complex wavelets (if they are advantageous for other reasons) could be used without increasing the hardware complexity of the drive electronics as compared to using integer wavelets. Control is also simple when the number of address lines is an integer power of two as explained in integer wavelet.

D. Implementation

Figure 13:
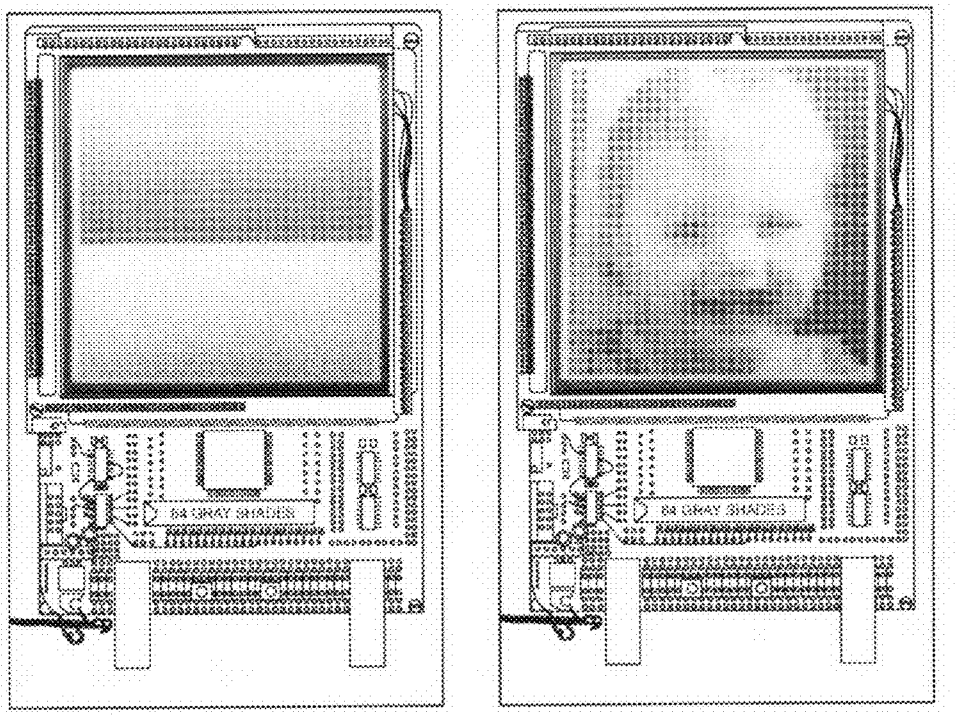
FIG. 13 shows photographs of a 32×32 matrix display that is capable of displaying thirty-two gray shades.
Figure 14:
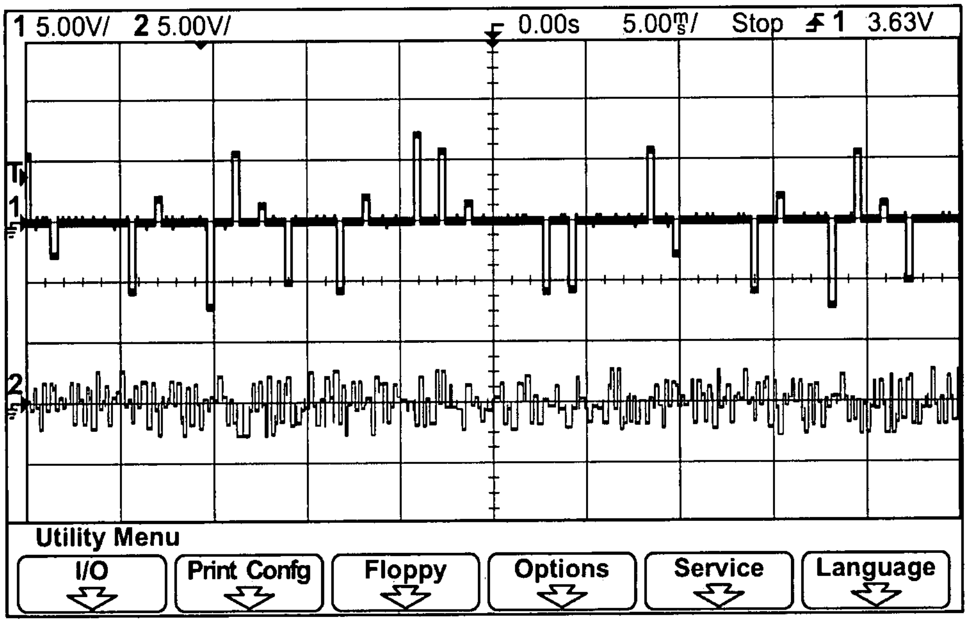
FIG. 14 shows typical row (scanning) and column (data) waveforms when thirty-two gray shades are displayed in a 32×32 matrix LCD.
Figure 15:
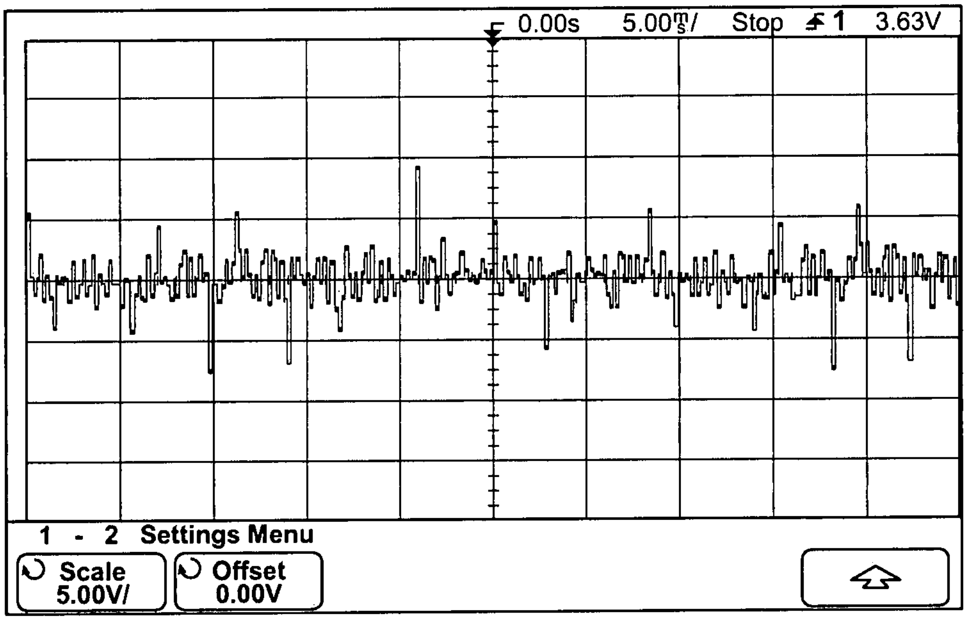
FIG. 15 shows a typical waveform across a pixel (row waveform minus the column waveform) in the prototype of the display capable of displaying thirty-two gray shades.

The technique is demonstrated with a 32×32 matrix twisted nematic (TN) liquid crystal display and the photographs of the prototype are shown in FIG. 13. The drivers used are capable of applying one of the eight voltages with a 8:1 multiplexer as both row and column drivers although it is adequate to have drivers that are capable of applying just four levels as row drivers. A controller for refreshing the display was implemented in a CPLD using 106 macro-cells, 243 product terms and 68 registers. Typical row and column waveforms are shown in FIG. 14 and the waveform across a pixel is shown in 15. Response times were measured when the pixels are switched from a gray to another and the results are shown in Table IV. The following information is useful for comparing the response times of the display under multiplexed (Table IV) and non-multiplexed conditions. The switch ON and switch OFF times of a cell of 3.9 μm and filled with the liquid crystal mixture RO-TN-403 was 30 and 12 ms respectively. Voltage across the pixel was switched to 1.33 volts (threshold voltage of the display) and 1.58 volts (voltage across an ON pixel when the number of lines multiplexed is 32) alternately by applying square waveforms.

Comparison with Other Techniques

Amplitude modulation needs sixty-two voltages in the column waveforms and three voltages in the row waveforms to display thirty-two gray shades. It takes 4N time intervals (including DC free operation) to complete a cycle when the gray shades are displayed using amplitude modulation technique (T. N. Ruckmongathan, Addressing Techniques for RMS Responding LCDs—A Review, Proc. Japan Display '92, pp. 77-80, 1992). A similar technique called the pulse height modulation technique also needs a large number of voltages in the data waveforms (A. R. Conner and T. J. Scheffer, Pulse-Height Modulation Gray Shading Methods for Passive Matrix LCDs, Proc. 12$^{th}$ International Display Research Conference (Japan Display '92) pp. 69-72, 1992). It is more appropriate to compare the wavelet-based techniques with the successive approximation techniques (K. G. Panikumar and T. N. Ruckmongathan, Displaying Gray Shades in Passive Matrix LCDs Using Successive Approximation, Proceedings of the 7$^{th}$ Asian Symposium on Information Display (ASID-2002), pp. 229-232, 2002), (T. N. Ruckmongathan, 'A Successive Approximation Technique for Displaying Gray Shades in Liquid Crystal Displays (LCDs)', IEEE trans. Image Processing, Vol. 16, No. 2, pp. 554-561, February 2007) because both these techniques are based on modulating the energy delivered to the pixels using several time intervals. A comparison of the wavelet-based technique with successive approximation techniques is given in Table V. Although the number of voltages in the waveforms is more when slant wavelets are used, the hardware complexity of drive electronics can be reduced as discussed in this paper.

CONCLUSION

Embodiments of the invention show that the number of time intervals to complete a cycle can be reduced when the number of gray shades is 16, 32, etc. by using slant wavelets. The hardware complexity of the drive electronics does not increase when complex non-integer wavelets are used to scan the display as compared to the integer wavelets. The techniques for eliminating repeated computation of the orthogonal transform of the data and the reduction of hardware complexity can be applied even when other wavelets are used for scanning the display instead of just Haar and slant. Other wavelets that could be used are Daubechies wavelets and Coiflet wavelets. Given below are few examples of wavelets that could be used, however the examples given here should not be consider as the limitation of the instant invention.

8 Shades: Non-integer $$\begin{bmatrix} +\sqrt{2} & +\sqrt{2} & -\sqrt{2} & -\sqrt{2} \\ +\sqrt{2} & -\sqrt{2} & 0 & 0 \\ 0 & 0 & +1 & -1 \end{bmatrix}$$

16 Shades: Non-integer (Non-DC free)

$$\begin{bmatrix} +2 & +2 & +2 & +2 \\ +\sqrt{2} & +\sqrt{2} & -\sqrt{2} & -\sqrt{2} \\ +\sqrt{2} & -\sqrt{2} & 0 & 0 \\ 0 & 0 & +1 & -1 \end{bmatrix}$$

-continued

32 Shades: Integer $$\begin{bmatrix} +2 & +2 & +2 & +2 & -2 & -2 & -2 & -2 \\ +2 & +2 & -2 & -2 & 0 & 0 & 0 & 0 \\ 0 & 0 & 0 & 0 & +1 & +1 & -1 & -1 \\ +2 & -2 & 0 & 0 & 0 & 0 & 0 & 0 \\ 0 & 0 & +1 & -1 & 0 & 0 & 0 & 0 \end{bmatrix}$$

64 Shades: Non-integer $$\begin{bmatrix} +2\sqrt{2} & +2\sqrt{2} & +2\sqrt{2} & +2\sqrt{2} & -2\sqrt{2} & -2\sqrt{2} & -2\sqrt{2} & -2\sqrt{2} \\ +2 & +2 & -2 & -2 & +2 & +2 & -2 & -2 \\ +2\sqrt{2} & -2\sqrt{2} & 0 & 0 & 0 & 0 & 0 & 0 \\ 0 & 0 & +2 & -2 & 0 & 0 & 0 & 0 \\ 0 & 0 & 0 & 0 & +\sqrt{2} & -\sqrt{2} & 0 & 0 \\ 0 & 0 & 0 & 0 & 0 & 0 & +1 & -1 \end{bmatrix}$$

128 Shades: Non-integer $$\begin{bmatrix} +4 & +4 & +4 & +4 & -4 & -4 & -4 & -4 \\ +4 & +4 & -4 & -4 & 0 & 0 & 0 & 0 \\ 0 & 0 & 0 & 0 & +2\sqrt{2} & +2\sqrt{2} & -2\sqrt{2} & -2\sqrt{2} \\ +2\sqrt{2} & -2\sqrt{2} & 0 & 0 & 0 & 0 & 0 & 0 \\ 0 & 0 & +2 & -2 & 0 & 0 & 0 & 0 \\ 0 & 0 & 0 & 0 & +\sqrt{2} & -\sqrt{2} & 0 & 0 \\ 0 & 0 & 0 & 0 & 0 & 0 & +1 & -1 \end{bmatrix}$$

TABLE IV

RESPONSE TIMES (IN MILLISECONDS) WHEN PIXELS ARE SWITCHED TO DIFFERENT GRAY SHADES USING WAVELETS.

| Gray shade value | 0 | 3 | 7 | 11 | 15 | 19 | 23 | 27 | 31 (ON) |
|---|---|---|---|---|---|---|---|---|---|
| 0 (OFF) | — | 72 | 65 | 60 | 55 | 52 | 50 | 44 | 40 |
| 3 | 75 | — | 68 | 70 | 56 | 61 | 58 | 55 | 52 |
| 7 | 70 | 78 | — | 72 | 57 | 54 | 52 | 50 | 50 |
| 11 | 61 | 75 | 75 | — | 73 | 58 | 55 | 48 | 40 |
| 15 | 60 | 73 | 64 | 80 | — | 78 | 63 | 55 | 53 |
| 19 | 58 | 75 | 60 | 65 | 90 | — | 65 | 54 | 51 |
| 23 | 50 | 70 | 58 | 66 | 75 | 87 | — | 60 | 55 |
| 27 | 45 | 60 | 56 | 60 | 58 | 73 | 72 | — | 44 |
| 31 (ON) | 44 | 65 | 54 | 52 | 55 | 65 | 69 | 59 | — |

TABLE V

COMPARISON OF THE GRAY SHADE TECHNIQUES (32 GRAY SHADES)

| Parameter | Successive approximation technique (Line-by-line) | Successive approximation (MLA) 4 lines in a subgroup | Technique Based on Integer Haar Wavelets | Technique based on modified Slant Wavelets |
|---|---|---|---|---|
| Number of time intervals for displaying 32 gray shades | 10N | 10N | 8N | 6N |

TABLE V-continued

COMPARISON OF THE GRAY SHADE TECHNIQUES (32 GRAY SHADES)

| Parameter | Successive approximation technique (Line-by-line) | Successive approximation (MLA) 4 lines in a subgroup | Technique Based on Integer Haar Wavelets | Technique based on modified Slant Wavelets |
|---|---|---|---|---|
| Number of voltages in scanning waveforms | 11 (16 for IAPT) | 11 | 5 | 11 |
| Number of voltages in the data waveforms | 10 (16 for IAPT) | 15 | 11 | 24 |

I claim:

1. A system to drive a matrix display using wavelets based addressing technique to reduce a number of time intervals for DC free operation, to reduce hardware of data drivers and to lower a supply voltage of display drivers, said system comprising:

a voltage level generator to provide predetermined voltages based on wavelets, wherein the wavelets are chosen based on gray shade data bits to form a wavelet matrix, a row voltage selector to select a group of voltages from the voltage level generator as input voltages to a plurality of row drivers, wherein the selected group of voltages depend on select vector which is a column in the wavelet matrix;

a column voltage selector to select a group of voltages from the voltage level generator as input voltages to a plurality of column drivers, the selected group of voltages depend on the select vector; and a controller to generate control signals to drive the matrix display using wavelets based on a predetermined addressing technique, thereby reducing the number of time intervals for DC free operation, reducing hardware of data drivers and lowering the supply voltage of display drivers;

wherein the row voltage selector and the column voltage selector select the group of voltages applied to the row drivers and the column drivers.

2. The system as claimed in claim 1, wherein the plurality of row drivers select a final voltage from the group of input voltages to drive rows of the display.

3. The system as claimed in claim 2, wherein the plurality of row drivers and the plurality of column drivers comprises one or more shift registers and latches to select the final voltage for each row or column.

4. The system as claimed in claim 1, wherein the plurality of column drivers select a final voltage from the group of input voltages to drive columns of the display.

5. The system as claimed in claim 1, wherein the row voltage selector and column voltage selector are analog multiplexers.

6. The system as claimed in claim 1, wherein the row voltage selector and the column voltage selector are common to the plurality of row drivers and the plurality of column drivers respectively.

7. The system as claimed in claim 1, wherein the controller sends control signals to the row and column voltage selectors and the row and column drivers to scan the display.

8. The system as claimed in claim 1, wherein the controller comprises a binary counter to generate an address of pixels.

9. A method of reducing hardware of data drivers, reducing a number of time intervals for DC free operation, and lowering a supply voltage of display drivers, said method comprising steps of:

a. choosing plurality of wavelets at least equal to number of gray shade data bits to form a wavelet matrix, wherein each column in the wavelet matrix is a select vector, b. grouping scanning electrodes based on the number of rows in the wavelet matrix and thereafter constructing a data matrix by selecting the gray shade data bits corresponding to elements of the wavelet matrix wherein each column of the data matrix is a data vector, c. generating voltages for data electrodes and thereby applying the voltages corresponding to the select vector to selected rows in the group and grounding the non-selected rows and simultaneously applying data voltages to the data electrodes, and d. rotating rows of the wavelet matrix and the data matrix once, followed by repeating step ‘c’ until every row of the wavelet matrix and the data matrix takes position of the first row in the respective matrix for displaying gray shades, thereby reducing the hardware of data drivers, reducing the number of time intervals for DC free operation and lowering the supply voltage of display drivers.

10. The method as claimed in claim 9, wherein the amplitude of each wavelet is an integer.

11. The method as claimed in claim 9, wherein energy of each wavelet is proportional to an integer power of two.

12. The method as claimed in claim 11, wherein the energy of each wavelet is chosen to correspond uniquely to weight of the gray shade data bit.

13. The method as claimed in claim 9, wherein the wavelets are DC free to ensure long life of display.

14. The method as claimed in claim 9, wherein the wavelet is selected from the group comprising Haar wavelet, slant wavelet and other wavelets.

15. The method as claimed in claim 9, wherein the voltage for data electrodes is generated using a dot product of the select vector and the data vector.

16. The method as claimed in claim 9, wherein the voltage for the data electrodes is generated for the entire data electrodes and the entire groups.

* * * * *